(12) United States Patent
Shukla et al.

(10) Patent No.: US 12,118,693 B2
(45) Date of Patent: Oct. 15, 2024

(54) METHOD AND ELECTRONIC DEVICE FOR CAPTURING MEDIA USING UNDER DISPLAY CAMERA

(71) Applicant: SAMSUNG ELECTRONICS CO., LTD., Suwon-si (KR)

(72) Inventors: Alok Shankarlal Shukla, Bengaluru (IN); Manoj Kumar, Bengaluru (IN); Saketh Sharma, Bengaluru (IN); Woojhon Choi, Suwon-si (KR); Wonjoon Do, Suwon-si (KR); Jaesung Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 195 days.

(21) Appl. No.: 17/950,331

(22) Filed: Sep. 22, 2022

(65) Prior Publication Data
US 2023/0028315 A1    Jan. 26, 2023

Related U.S. Application Data

(63) Continuation of application No. PCT/KR2022/010518, filed on Jul. 19, 2022.

(30) Foreign Application Priority Data

Jul. 21, 2021  (IN) .............................. 202141032832
Mar. 7, 2022  (IN) .............................. 202141032832

(51) Int. Cl.
*G06T 5/50*    (2006.01)
*G06T 5/73*    (2024.01)
(Continued)

(52) U.S. Cl.
CPC ................. *G06T 5/50* (2013.01); *G06T 5/73* (2024.01); *G06T 5/80* (2024.01); *G06T 7/10* (2017.01);
(Continued)

(58) Field of Classification Search
None
See application file for complete search history.

(56) References Cited

U.S. PATENT DOCUMENTS

| 8,036,486 B2 | 10/2011 | Sakurai et al. |
| 8,195,000 B2 | 6/2012 | Sakurai et al. |
| (Continued) | | |

FOREIGN PATENT DOCUMENTS

| CN | 110460825 A | 11/2019 |
| CN | 111123538 A | 5/2020 |
| (Continued) | | |

OTHER PUBLICATIONS

Zhou et al., "Image Restoration for Under-Display Camera", Proceedings of the IEEE/CVF Conference on Computer Vision and Pattern Recognition, 2021, (10 pages total).
(Continued)

*Primary Examiner* — Quan Pham
(74) *Attorney, Agent, or Firm* — Sughrue Mion, PLLC

(57) ABSTRACT

An electronic device includes a UDC and a UDC controller configured to determine an optimal number of frames required to be captured for a scene to compensate at least one parameter to optimize an output media using the UDC, obtain a multi-frame fusion media by performing at least one multi-frame fusion on the determined optimal number of frames, perform a light source spread correction on the multi-frame fusion media, and optimize the output media based on the light source spread correction on the multi-frame fusion media.

15 Claims, 34 Drawing Sheets

(51) Int. Cl.

| | | |
|---|---|---|
| *G06T 5/80* | (2024.01) | |
| *G06T 7/10* | (2017.01) | |
| *G06T 7/70* | (2017.01) | |
| *H04N 5/265* | (2006.01) | |
| *H04N 23/53* | (2023.01) | |
| *H04N 23/71* | (2023.01) | |
| *H04N 23/72* | (2023.01) | |
| *H04N 23/741* | (2023.01) | |

(52) U.S. Cl.

CPC ............... *G06T 7/70* (2017.01); *H04N 5/265* (2013.01); *H04N 23/53* (2023.01); *H04N 23/71* (2023.01); *H04N 23/72* (2023.01); *H04N 23/741* (2023.01); *G06T 2207/10024* (2013.01); *G06T 2207/10144* (2013.01); *G06T 2207/20208* (2013.01); *G06T 2207/20221* (2013.01)

(56) References Cited

U.S. PATENT DOCUMENTS

| | | | |
|---|---|---|---|
| 2008/0002030 A1 | 1/2008 | Sakurai et al. | |
| 2008/0165267 A1* | 7/2008 | Cok | H04N 7/144 348/E5.022 |
| 2011/0279711 A1 | 11/2011 | Sakurai et al. | |
| 2014/0240549 A1* | 8/2014 | Seshadrinathan | H04N 23/843 348/239 |
| 2016/0239946 A1 | 8/2016 | Naruse et al. | |
| 2019/0370948 A1 | 12/2019 | Tico et al. | |
| 2020/0143519 A1 | 5/2020 | Gordon et al. | |
| 2020/0221009 A1 | 7/2020 | Citerin et al. | |
| 2020/0234414 A1 | 7/2020 | Zamir et al. | |
| 2021/0029336 A1 | 1/2021 | Liu et al. | |
| 2021/0136291 A1 | 5/2021 | Chu et al. | |
| 2021/0152735 A1 | 5/2021 | Zhou et al. | |
| 2022/0159162 A1 | 5/2022 | Sun et al. | |
| 2022/0311925 A1 | 9/2022 | Peng et al. | |
| 2023/0230204 A1 | 7/2023 | Xu et al. | |

FOREIGN PATENT DOCUMENTS

| | | |
|---|---|---|
| CN | 112133197 A | 12/2020 |
| CN | 113132626 A | 7/2021 |
| CN | 113139911 A | 7/2021 |
| JP | 2008-66978 A | 3/2008 |

OTHER PUBLICATIONS

Feng et al., "Removing Diffraction Image Artifacts in Under-Display Camera via Dynamic Skip Connection Network", Proceedings of the IEEE/CVF Conference on Computer Vision and Pattern Recognition, 2021, (10 pages total).

Written Opinion (PCT/ISA/237) dated Oct. 31, 2022, issued by the International Searching Authority in International Application No. PCT/KR2022/010518.

International Search Report dated Oct. 31, 2022, issued by the International Searching Authority in International Application No. PCT/KR2022/010518.

Communication dated Jun. 8, 2023, issued by Indian Patent Office in Indian Patent Application No. 202141032832.

Communication dated Jul. 19, 2024, issued by the European Patent Office in counterpart European Application No. 22846187.7.

Kim et al., "Fast Image Restoration and Glare Removal for Under-Display Camera by Guided Filter," SID 2021 Digest, pp. 222-223, 2021, XP071446736.

\* cited by examiner

PSF of UDC

Image from UDC

FIG. 5
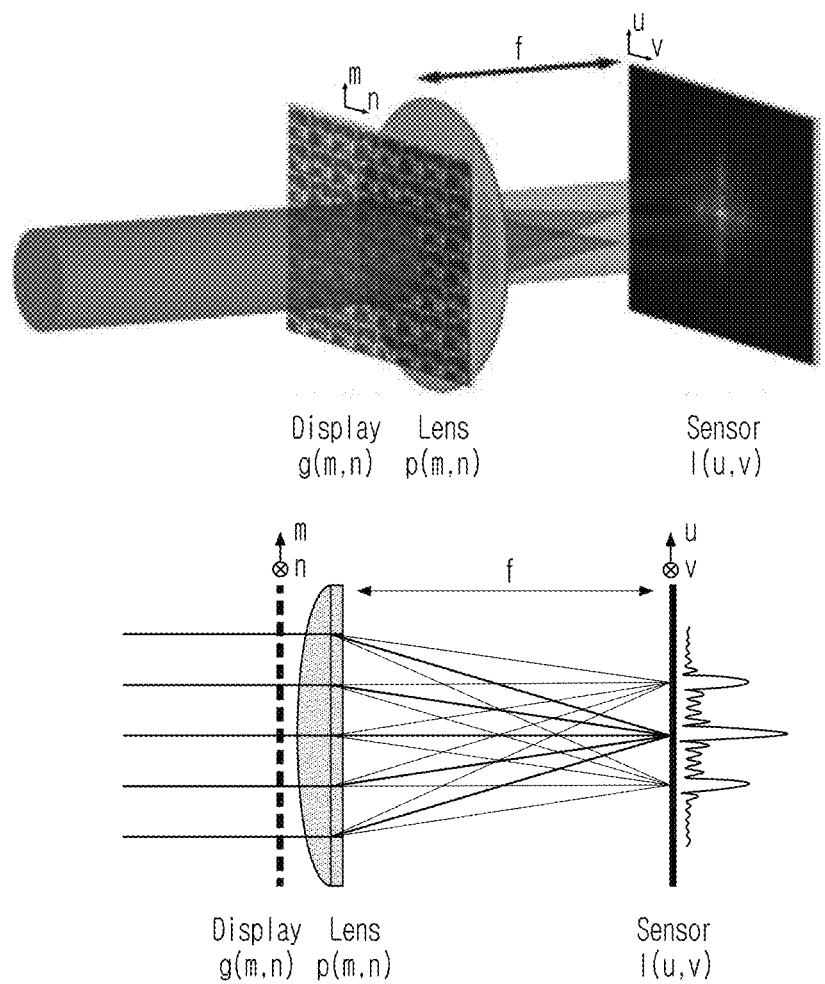
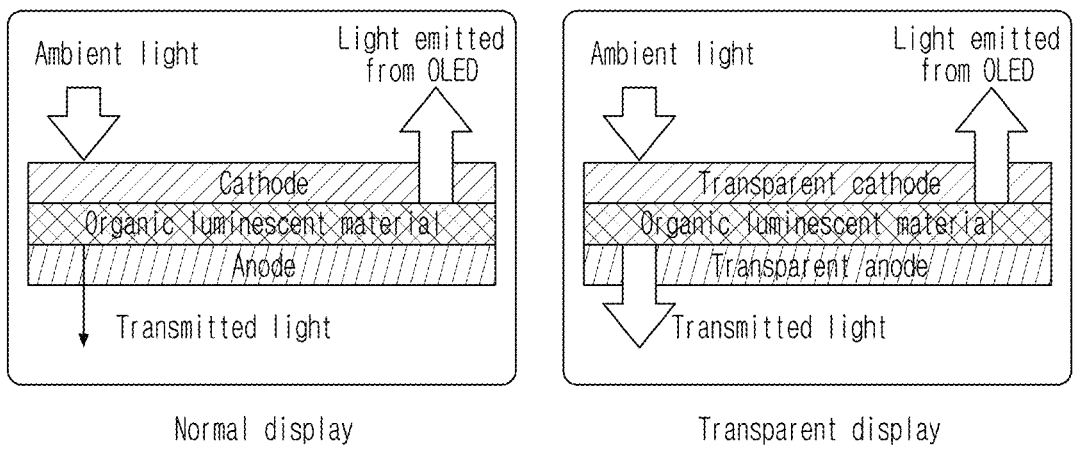

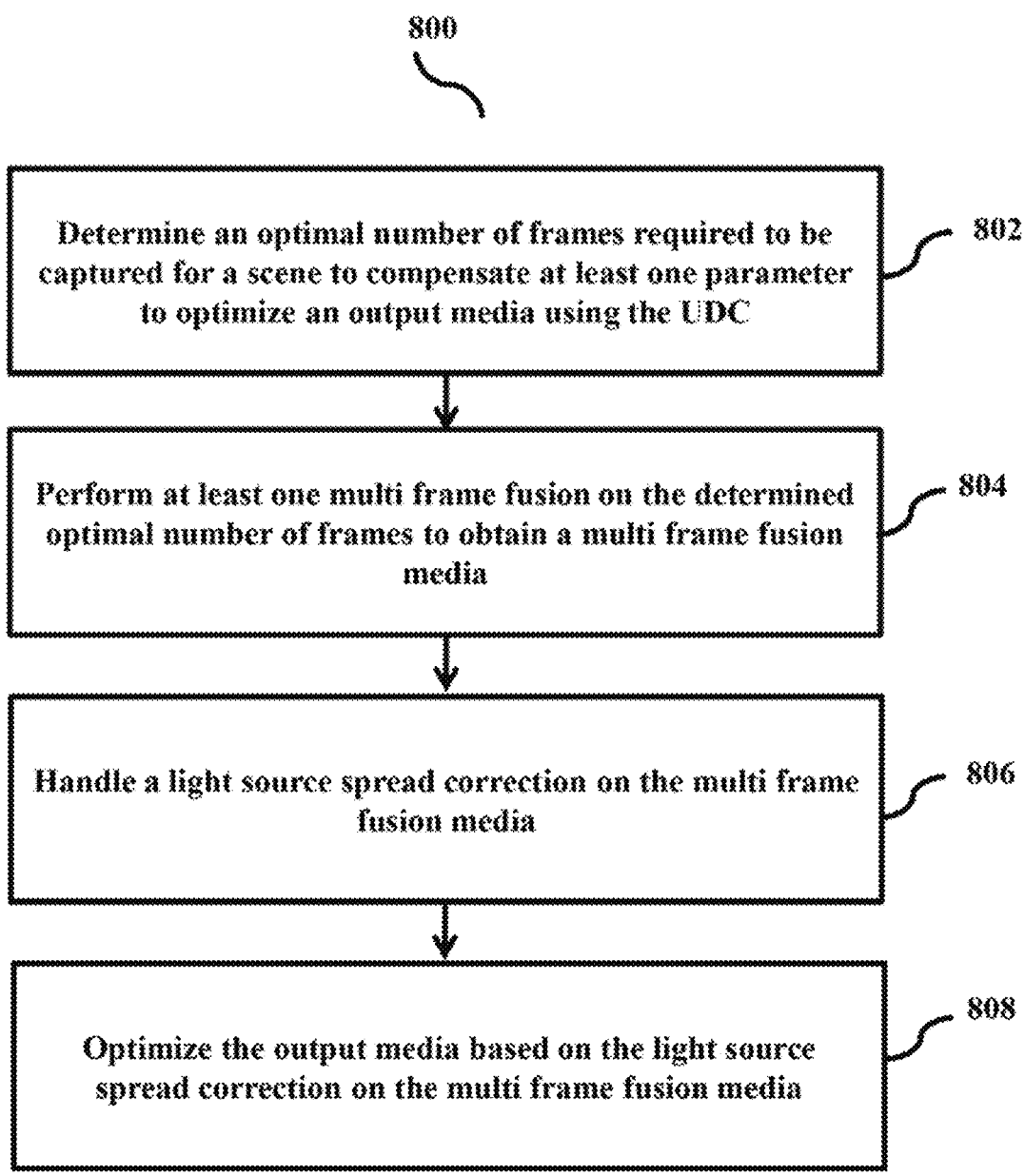

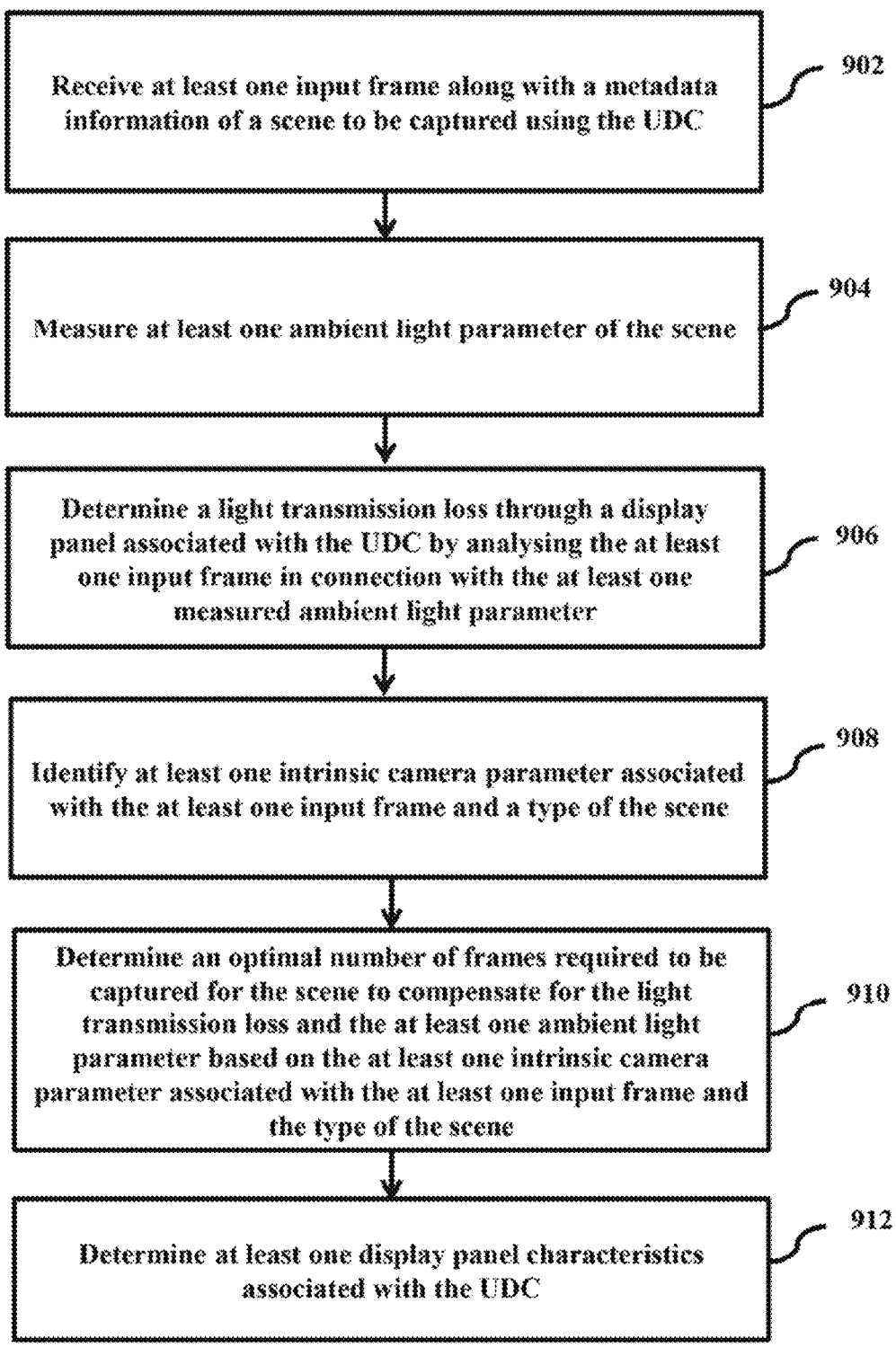

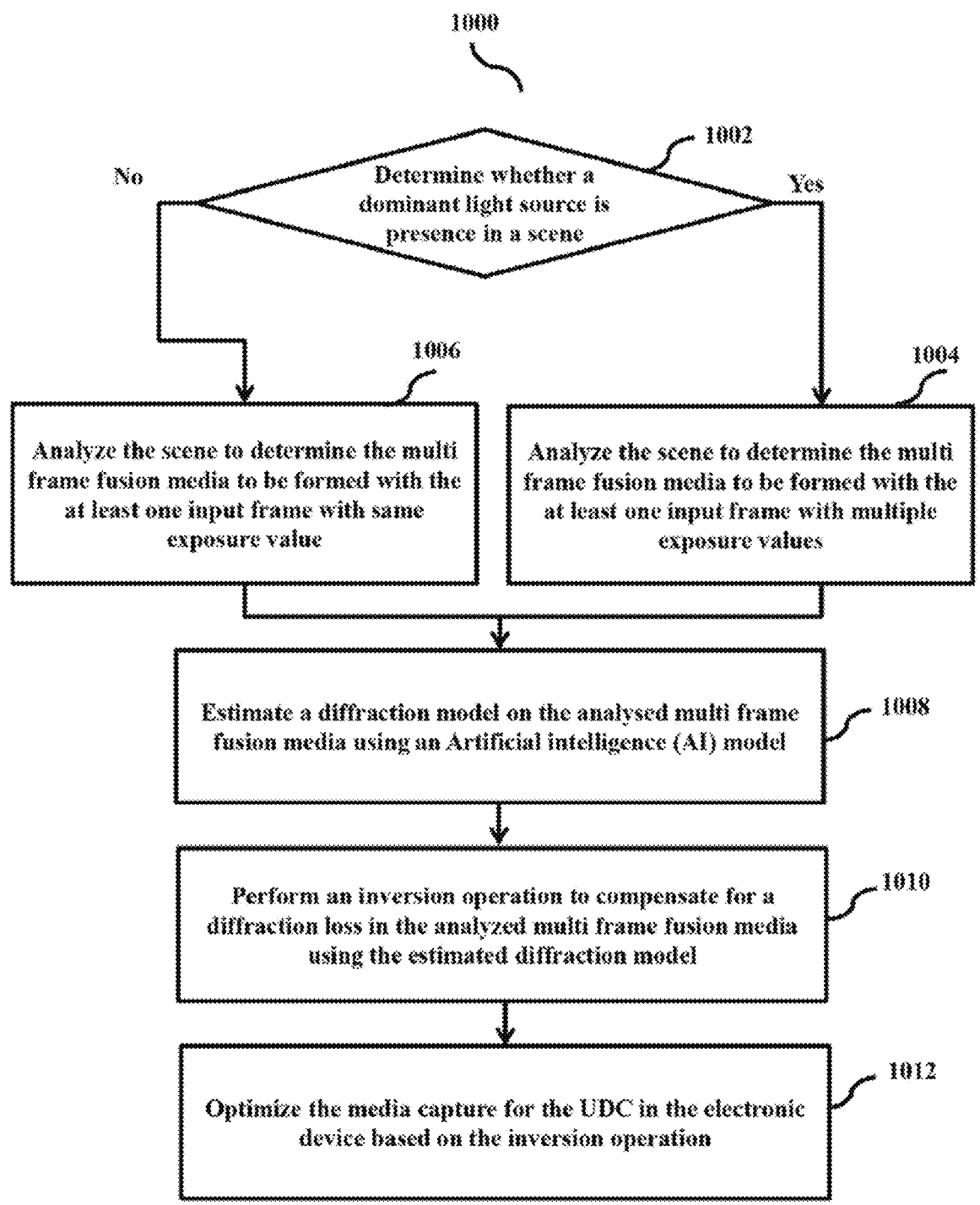

1200b

FIG. 15A
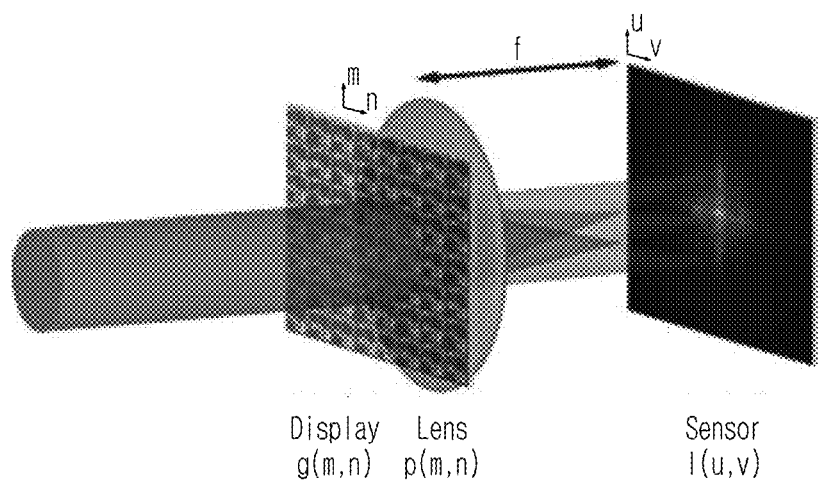
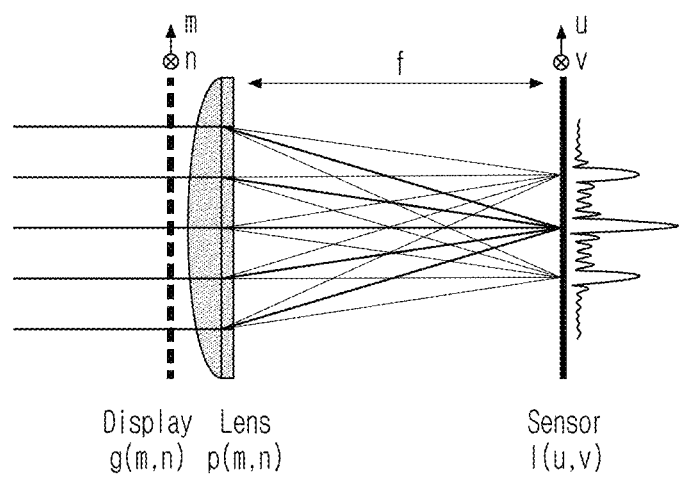

FIG. 15B
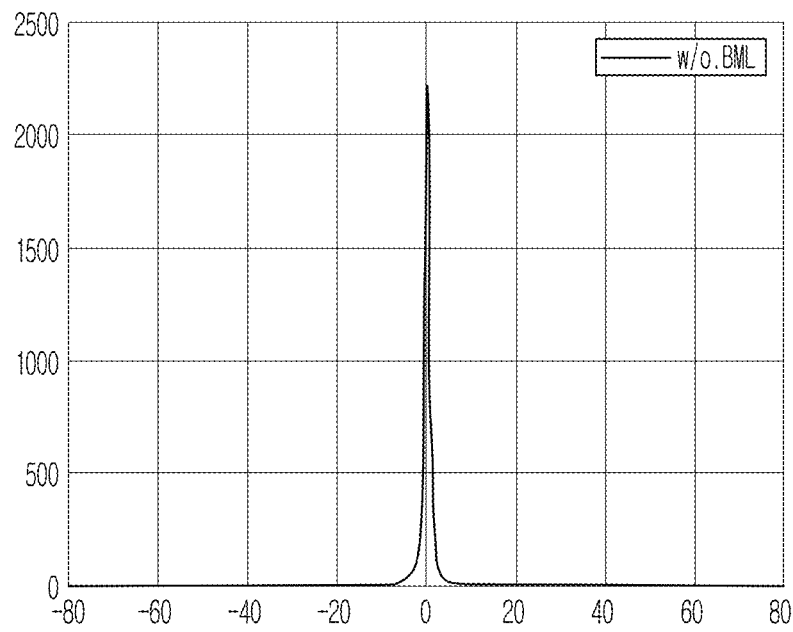
(a) General LSF
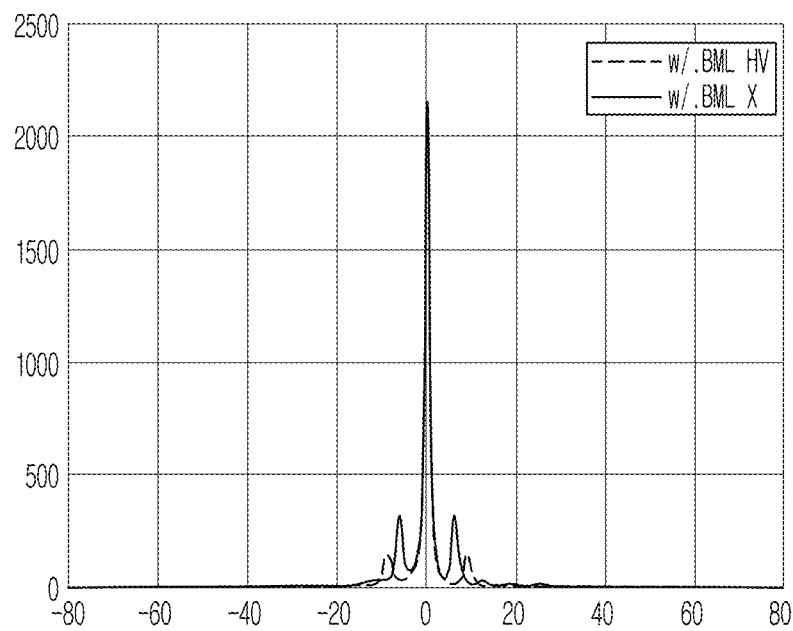
(b) LSF of UDC

"a" "b"

FIG. 19
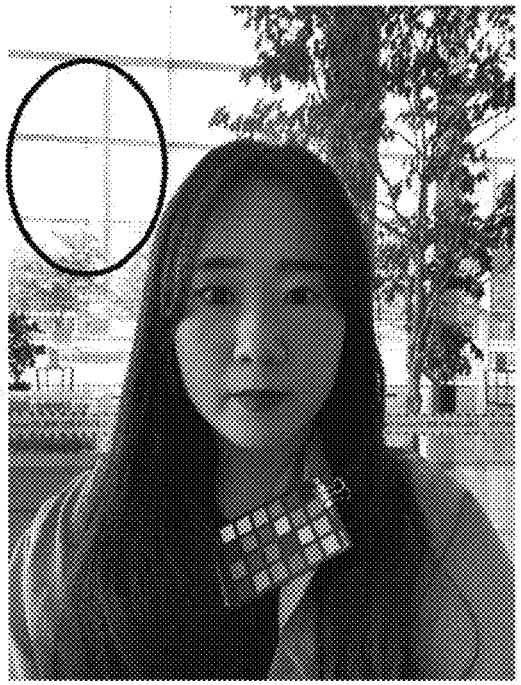
"a"
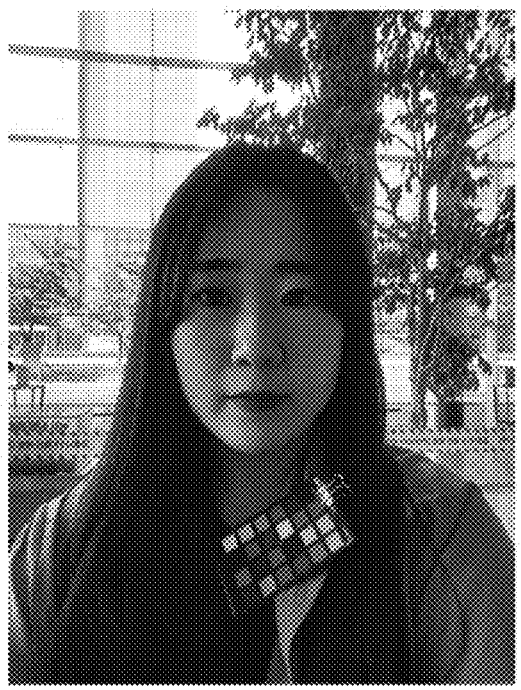
"b"

FIG. 20
"a"
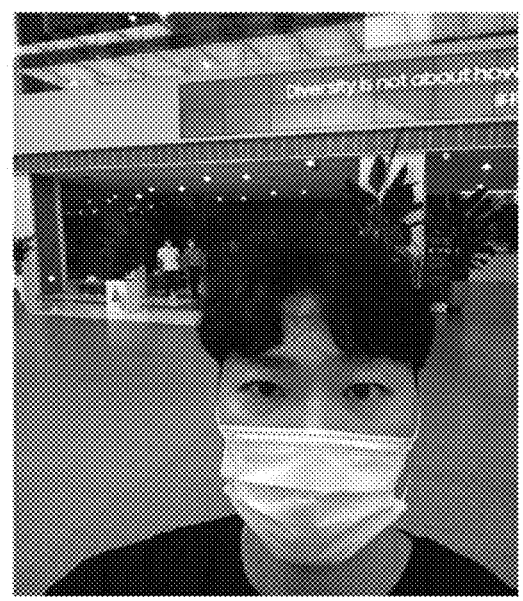
"b"

FIG. 21
2100
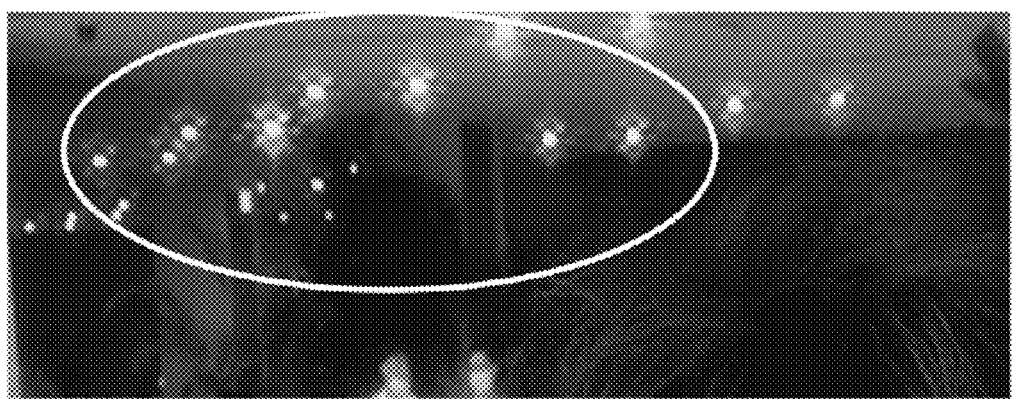
"a"
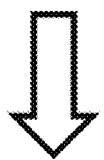
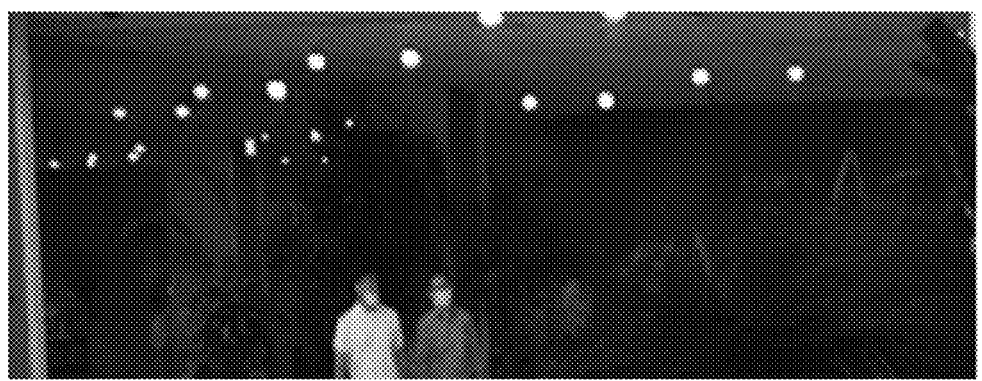
"b"

"a" "b"

FIG. 24
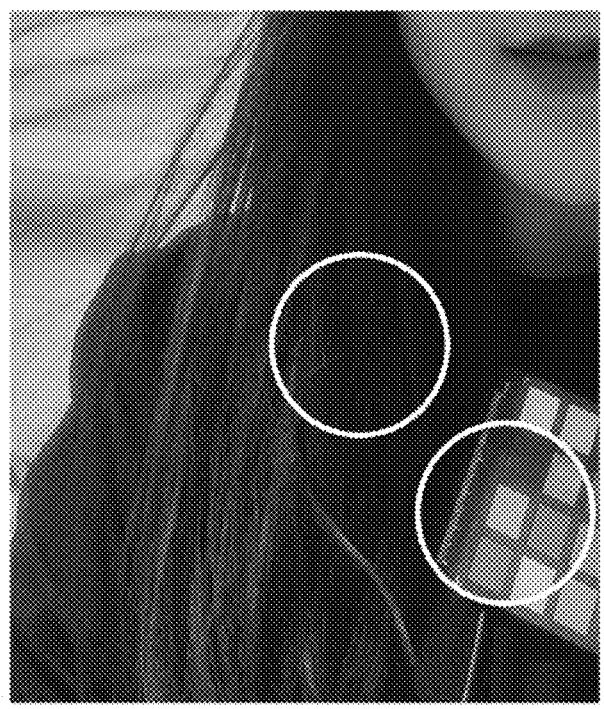
"a"
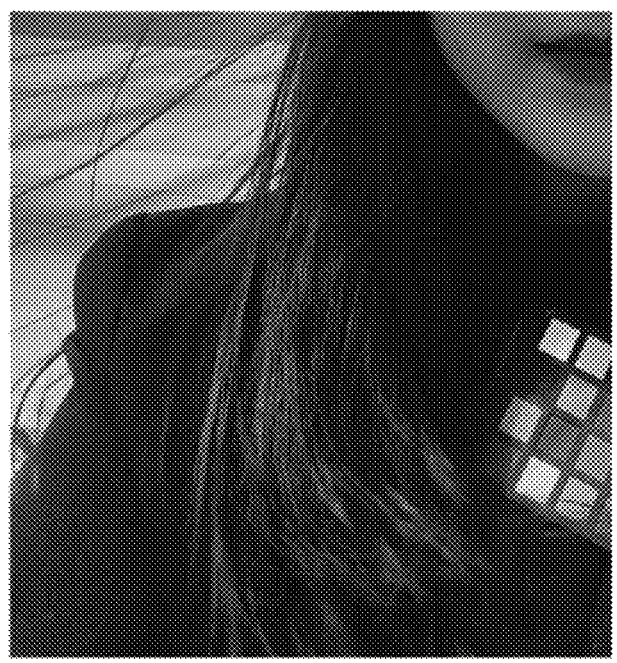
"b"

METHOD AND ELECTRONIC DEVICE FOR CAPTURING MEDIA USING UNDER DISPLAY CAMERA

CROSS-REFERENCE TO RELATED APPLICATION(S)

This application is a bypass continuation of International Application No. PCT/KR2022/010518, filed on Jul. 19, 2022, which is based on and claims priority to Indian Provisional Application No. 202141032832, filed on Jul. 21, 2021, and Indian Complete Application No. 202141032832, filed on Mar. 7, 2022, in the Indian Patent Office, the disclosures of which are incorporated by reference herein in their entireties.

BACKGROUND

1. Field

The disclosure relates generally to image processing in electronic devices, and more particularly to methods and systems for under display camera (UDC) image restoration with intelligent multi-frame fusion and artificial intelligence (AI) image restoration.

2. Description of the Prior Art

Developments of under display camera (UDC) systems provide a true bezel less and notch free viewing experience on electronic devices such as smartphones, television (TV), laptops, tablets, and so on, while allowing images to be captured from a selfie camera embedded underneath. Due to the display panel blocking a camera lens system in the UDC, the UDC images suffer from low transmission of light, blur, noise, haze, and flare like degradation. There is a large variety of display panels in use and the UDC image degradation estimated by analyzing the optical system characteristic and diffraction pattern of display panel in consideration is important. Due to low transmission of light to the UDC, images suffer from noise and brightness. The characteristic of UDC image degradation (e.g., flare, blur, low light, haze, and so on) depends on the capture scene, ambient light and dominant light source presence in the scene.

Overcoming the UDC image quality degradation and enabling UDC image restoration remains elusive because of multiple challenges; for example, the images have low light transmission rate and a diffraction effect. Further, in a plastic organic light emitting diode (P-OLED), although the open area may be as large as 23%, the light transmission rate is only 2.9%. There are challenges in determining the diffraction pattern and point spread function (PSF) as light diffracts as it propagates through obstacles with sizes that are similar to its wavelength.

FIG. 1 is a diagram of diffraction characteristics for different display panels of an Under Display Camera (UDC). The diffraction occurs due to the Bottom Metal Layer (BML) pattern of the UDC. The P-OLED results in lower SNR and has color shift issue. The open area of transparent organic light emitting diode (T-OLED) is 21%, whereas for P-OLED, the open area is 23%. However, the transmission rate of T-OLED is 20%, whereas for P-OLED, the transmission rate is 2.9%.

FIGS. 2a and 2b are diagrams of an example PSF of UDC 20a and an example image 20b from UDC. As depicted in FIG. 2, light diffracts as it propagates through obstacles with sizes that are similar to wavelength.

FIG. 3 is a diagram of example images 30, where there is presence of flare due to reflection of light by display panel. The imaging quality of the UDC will be severely degraded due to lower light transmission rate and diffraction effects of display panel.

FIGS. 4a and 4b are diagrams of example effects of diffraction on an image 40a without UDC and an image 40b with UDC.

FIG. 5 is a diagram of a UDC, and an imaging system that mounts display screen on top of a digital camera lens. The UDC restoration is a combination of tasks such as low light enhancement, de-blurring and de-noising. The restoration is adaptive to the candidate display panel and camera imaging system.

SUMMARY

Provided are methods and electronic devices for capturing media using an under display camera (UDC).

Provided are methods and electronic devices for under display camera image restoration with intelligent multi-frame fusion and artificial intelligence (AI) image restoration.

Provided are methods and electronic devices to determine the optimal number of frames (N) for multi-frame fusion for under display camera image restoration.

Provided are methods and electronic devices to determine camera parameters (e.g., exposure, gain, color, temperature or the like) by analyzing the transmission characteristic display panel and light transmission loss.

Provided are methods and electronic devices to enable dynamic pipeline selection for under display camera image restoration based on the light source present in the scene and corresponding ambient light conditions.

Provided are methods and electronic devices to compensate the light spread for image captured via under display camera by localization of light source and applying corresponding compensation locally to the region.

Provided are methods and electronic devices to estimate the display panel characteristic and degradation of UDC images, so as to define the optimal number of frames, camera parameters for each frame to be used for the multi-frame fusion, optimal pipeline selection and compensation for dominant light source. Hence, the method may be used to provide overall UDC image quality improvement and improve the user experience.

Provided are methods and electronic devices to configure the UDC for the electronic device and image restoration based on ambient light conditions and compensating for the loss caused by the display panel blocking the camera.

Additional aspects will be set forth in part in the description which follows and, in part, will be apparent from the description, or may be learned by practice of the presented embodiments.

According to an aspect of the disclosure, an electronic device may include a UDC and a UDC controller configured to determine an optimal number of frames required to be captured for a scene to compensate at least one parameter to optimize an output media using the UDC, obtain a multi-frame fusion media by performing at least one multi-frame fusion on the determined optimal number of frames, perform a light source spread correction on the multi-frame fusion media, and optimize the output media based on the light source spread correction on the multi-frame fusion media.

The UDC controller may be configured to determine the optimal number of frames by receiving at least one input frame and a metadata information of the scene to be captured using the UDC, measuring at least one ambient light parameter of the scene, determining a light transmission loss through a display panel associated with the UDC by analyzing at least one input frame in connection with at least one ambient light parameter, and identifying at least one intrinsic camera parameter associated with the at least one input frame and a type of the scene and determine the optimal number of frames required to be captured for the scene to compensate for the light transmission loss and the at least one ambient light parameter based on the at least one intrinsic camera parameter associated with the at least one input frame and the type of the scene.

The at least one intrinsic camera parameter may include at least one of an exposure time, a gain, a color, temperature and a focus region, and the type of the scene may include at least one of an indoor environment, an outdoor environment, a mix lighting condition, a bright day light, and low light condition.

The UDC controller may be configured to determine at least one display panel characteristic associated with the UDC for capturing each frame among the optimal number of frames, apply the measured light transmission loss, the at least one ambient light parameter and the display panel characteristics for capturing each frame among the optimal number of frames; and automatically modify at least one media capture setting of the UDC by applying the measured light transmission loss, the at least one ambient light parameter and the at least one display panel characteristic.

The UDC controller may be configured to determine the at least one display panel characteristic associated with the UDC by obtaining at least one intrinsic camera parameter associated with the at least one input frame, and determining the at least one display panel characteristic associated with the UDC based on the at least one intrinsic camera parameter.

The at least one display panel characteristic may include a diffraction pattern, a point spread function of the display panel, and a modulation transfer function (MTF) of the display panel.

The UDC controller may be configured to determine the light transmission loss by analyzing at least one preview frame from the UDC, and estimating the light transmission loss for the display panel based on the analyzing of the at least one preview frame.

The UDC controller may be further configured to obtain the multi-frame fusion media by determining whether a dominant light source is present in the scene, performing at least one of analyzing the scene to determine the multi-frame fusion media to be formed with at least one input frame with multiple exposure values upon determining the dominant light source is present in the scene or analyzing the scene to determine the multi-frame fusion media to be formed with the at least one input frame with a same exposure value upon determining the dominant light source is not present in the scene, estimating a diffraction model on the multi-frame fusion media using an artificial intelligence (AI) model, and performing an inversion operation to compensate for a diffraction loss in the multi-frame fusion media using the estimated diffraction model.

The diffraction model may be estimated on the multi-frame fusion media based on transmission characteristics of a display panel and a light transmission loss.

The UDC controller may be configured to perform the light source spread correction on the multi-frame fusion media by analyzing the multi-frame fusion media to determine a type of the scene and localize a light source in the scene, creating a segmentation mask for the localized light source in the scene, applying a light spread correction for the localized light source in the scene using the segmentation mask, and performing a content aware sharpness improvement to enhance the output media based on the applied light spread correction.

The light spread correction may be applied for the localized light source in the scene using an AI model, and the AI model may be configured to learn a light spread function of display panel over a period of time.

The at least one parameter may include at least one of a light transmission loss associated with the scene, an ambient light parameter associated with the scene, a display panel characteristic associated with the UDC, an exposure time associated with at least one input frame, a gain associated with the at least one input frame, a temperature associated with the at least one input frame and focus region, and an environment lighting condition.

According to an aspect of the disclosure, an electronic device may include a UDC and a UDC controller configured to receive at least one input frame and a metadata information of a scene to be captured using the UDC, measure at least one ambient light parameter of the scene, determine a light transmission loss through a display panel associated with the UDC by analyzing the at least one input frame in connection with at least one measured ambient light parameter, identify at least one intrinsic camera parameter associated with the at least one input frame and a type of the scene, determine an optimal number of frames required to be captured for the scene to compensate for the light transmission loss and at least one ambient light parameter based on the at least one intrinsic camera parameter associated with the at least one input frame and the type of the scene, determine at least one display panel characteristic associated with the UDC, apply the measured light transmission loss, the at least one ambient light parameter and the display panel characteristics for capturing each frame among the optimal number of frames, automatically modify at least one media capture setting of the UDC by applying the measured light transmission loss, the at least one ambient light parameter and the at least one display panel characteristic, and optimize a media capture for the UDC in the electronic device based on the at least one modified media capture setting of the UDC.

According to an aspect of the disclosure, a method for capturing media using a UDC in an electronic device may include determining, by the electronic device, an optimal number of frames required to be captured for a scene to compensate at least one parameter to optimize an output media using the UDC, obtaining, by the electronic device, a multi-frame fusion media by performing at least one multi-frame fusion on the determined optimal number of frames, performing, by the electronic device, a light source spread correction on the multi-frame fusion media, and optimizing, by the electronic device, the output media based on the light source spread correction on the multi-frame fusion media.

Determining, by the electronic device, the optimal number of frames may include receiving, by the electronic device, at least one input frame and a metadata information of the scene to be captured using the UDC, measuring, by the electronic device, at least one ambient light parameter of the scene, determining, by the electronic device, a light transmission loss through a display panel associated with the UDC by analyzing the at least one input frame in connection with at least one measured ambient light parameter, identifying, by the electronic device, at least one intrinsic camera parameter associated with the at least one input frame and a type of the scene, and determining, by the electronic device, the optimal number of frames required to be captured for the scene to compensate for the light transmission loss and the at least one ambient light parameter based on the at least one intrinsic camera parameter associated with the at least one input frame and the type of the scene.

These and other aspects of the embodiments herein will be better appreciated and understood when considered in conjunction with the following description and the accompanying drawings. It should be understood, however, that the following descriptions, while indicating embodiments and numerous specific details thereof, are given by way of illustration and not of limitation. Many changes and modifications may be made within the scope of the embodiments herein without departing from the scope thereof, and the embodiments herein include all such modifications.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a diagram of a UDC, and an imaging system that mounts display screen on a top of a digital camera lens;

FIG. 8 is a flowchart of a method for capturing media using the UDC in the electronic device, according to an embodiment;

FIGS. 9a and 9b are a flowchart of a method for capturing media using the UDC in the electronic device based on a media capture setting of the UDC, according to an embodiment;

FIG. 10 is a flowchart of a method for capturing media using the UDC in the electronic device based on a dominant light source presence in a scene, according to embodiments an embodiment;

FIGS. 15a and 15b are diagrams of an example illustration in which a line spread function (LSF) is explained based on the UDC, according to an embodiment;

FIG. 19 is a diagram of an example illustration in which a UDC image restoration is performed using a high dynamic range (HDR) pipeline, according to an embodiment;

FIGS. 20 and 21 are diagrams of example illustrations in which restorations of UDC images through light spread correction is depicted, according to an embodiment; and FIGS. 22, 23, 24 and 25 are diagrams of example illustrations in which UDC image restorations are depicted, according to an embodiment.

DETAILED DESCRIPTION

Figure 1:
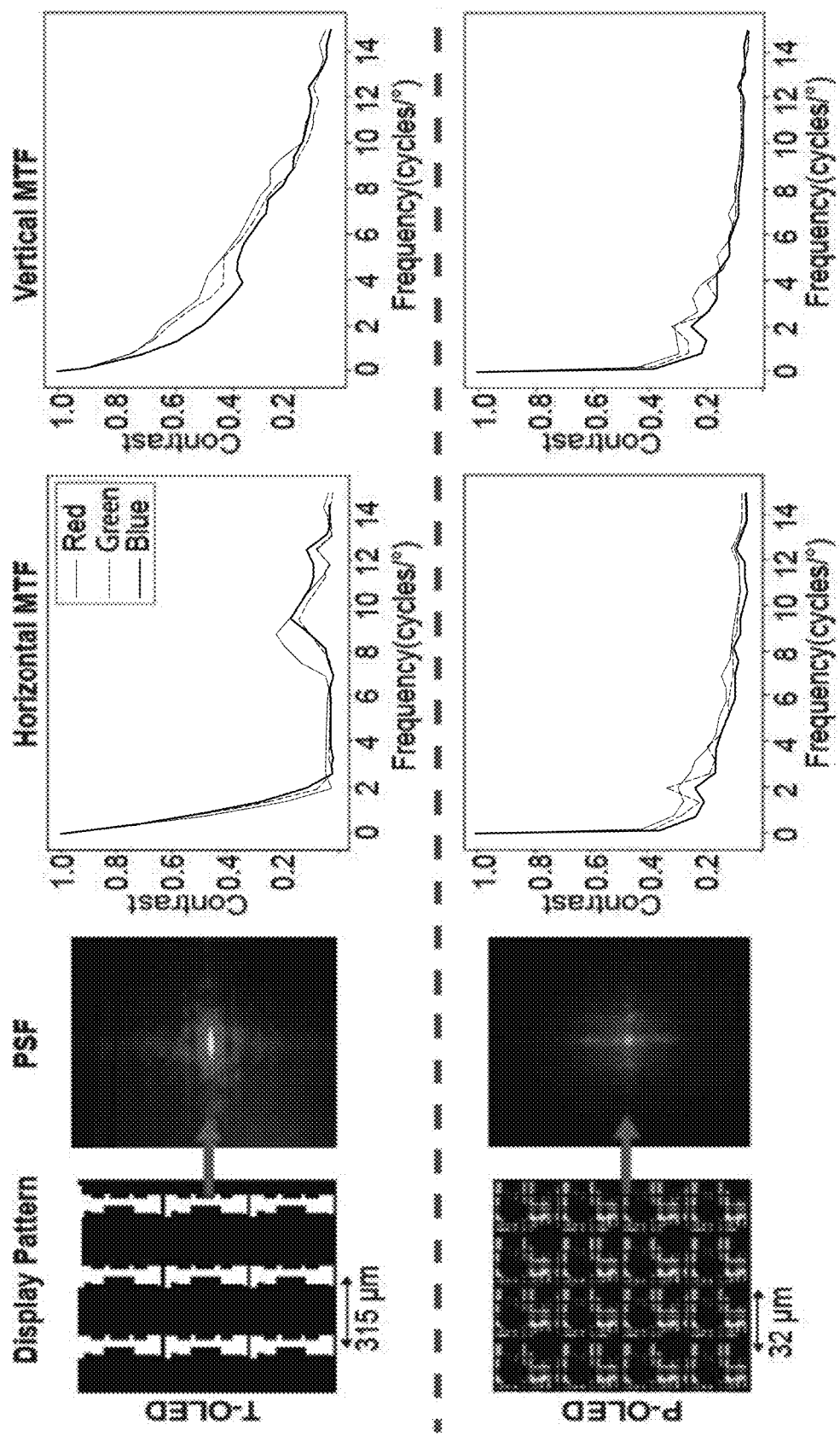
FIG. 1 is a diagram of diffraction characteristics for different display panels of an under display camera (UDC)
Figure 2A:
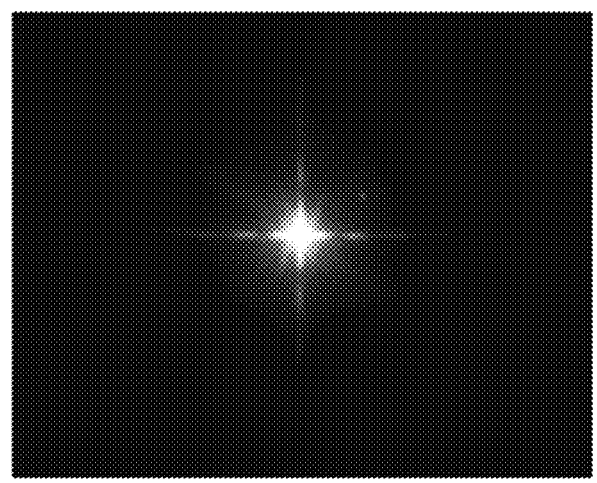
FIGS. 2a and 2b are diagrams of an example Point Spread Function (PSF) of UDC and an example image from a UDC, according to prior art.
Figure 2B:
Figure 3:
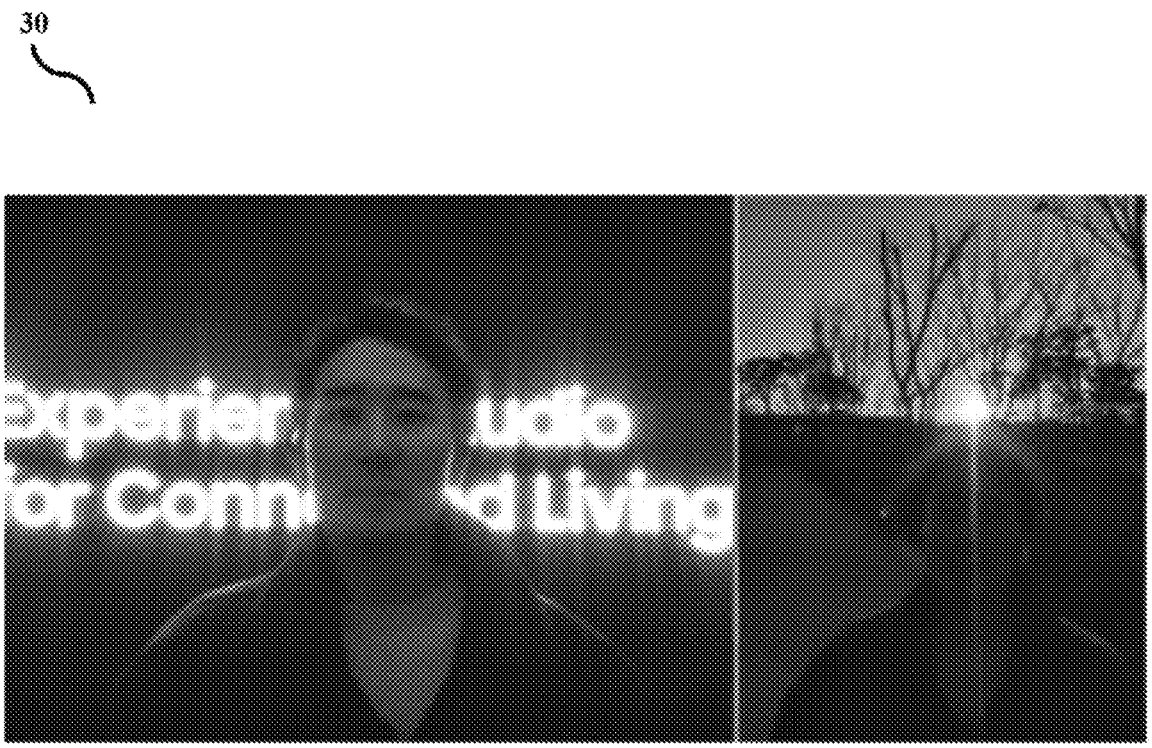
FIG. 3 is a diagram of example images, where there is presence of flare due to reflection of light by a display panel.
Figure 4A:
FIGS. 4a and 4b are diagrams of example effects of diffraction on an image without UDC and with UDC.
Figure 4B:
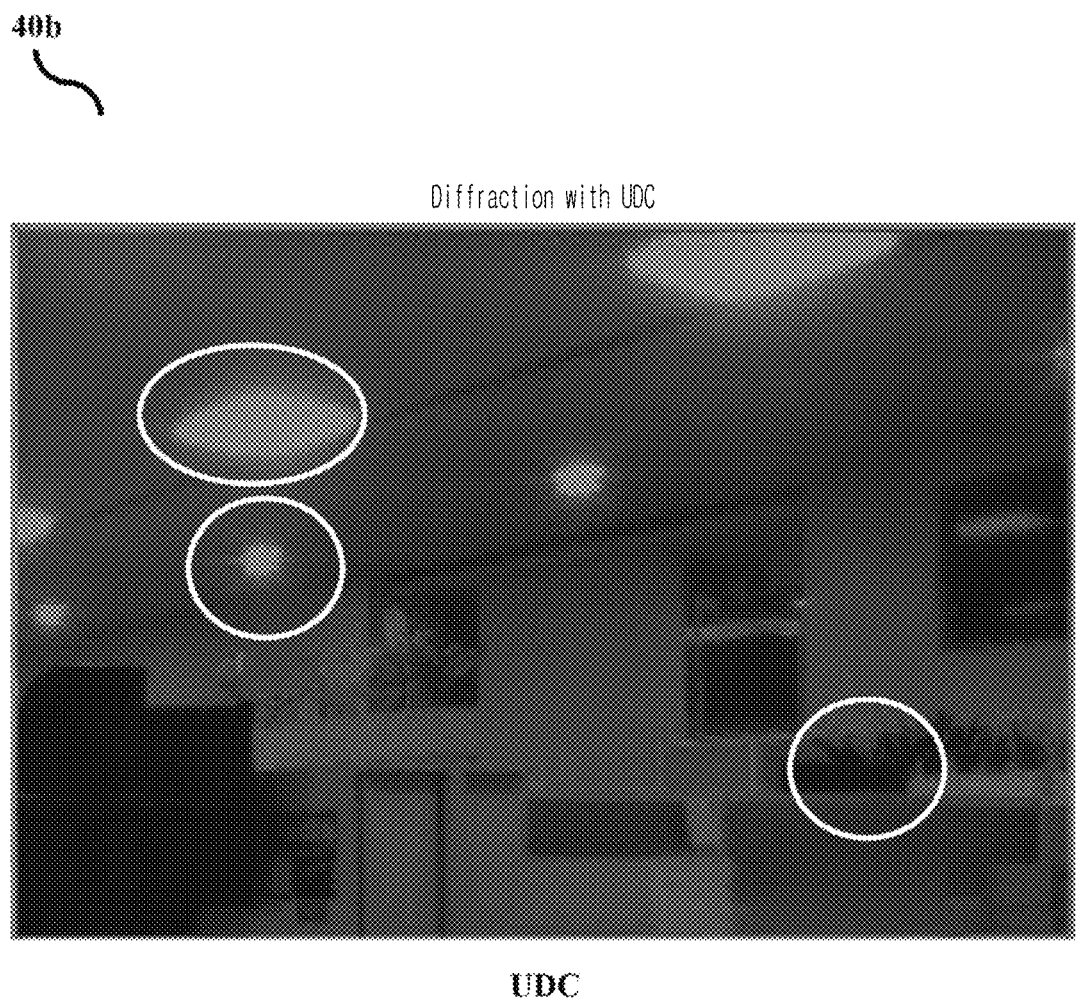

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Accordingly, the embodiments provide methods for capturing media using an under display camera (UDC) in an electronic device. The method includes determining, by the electronic device, an optimal number of frames required to be captured for a scene to compensate at least one parameter to optimize an output media using the UDC. Further, the method includes performing, by the electronic device, at least one multi-frame fusion on the determined optimal number of frames to obtain a multi-frame fusion media. Further, the method includes handling, by the electronic device, a light source spread correction on the multi-frame fusion media. Further, the method includes optimizing, by the electronic device, the output media based on the light source spread correction on the multi-frame fusion media.

The method disclosed herein may be used for under display camera image restoration with intelligent multi-frame fusion and artificial intelligence (AI) image restoration. The method disclosed herein can be used is to determine the optimal number of frames (N) for multi-frame fusion for under display camera image restoration. The method may be used to determine the camera parameters (e.g., exposure, gain, color temperature) by analyzing the transmission characteristic display panel and light transmission loss.

The method disclosed herein may be used to enable dynamic pipeline selection for under display camera image restoration based on the light source present in the scene and corresponding ambient light conditions. The method disclosed herein may be used to compensate the light spread for image captured via under display camera by localization of light source and applying corresponding compensation locally to the region.

The method disclosed herein may be used to estimate the display panel characteristic and degradation of UDC images, so as to define the optimal number of frames, camera parameters for each frame to be used for the multi-frame fusion, optimal pipeline selection and compensation for dominant light source. Hence, the method may be used to provide overall UDC image quality improvement. The method may be used to improve content aware sharpness to restore UDC image, so as to improve the user experience.

The method disclosed herein may be used to configure the UDC for the electronic device and image restoration based on ambient light conditions and compensating for the loss caused by the display panel blocking the camera.

Referring now to the drawings, and more particularly to FIGS. 6 through 25, where similar reference characters denote corresponding features consistently throughout the figures, there are shown preferred embodiments.

Figure 6:
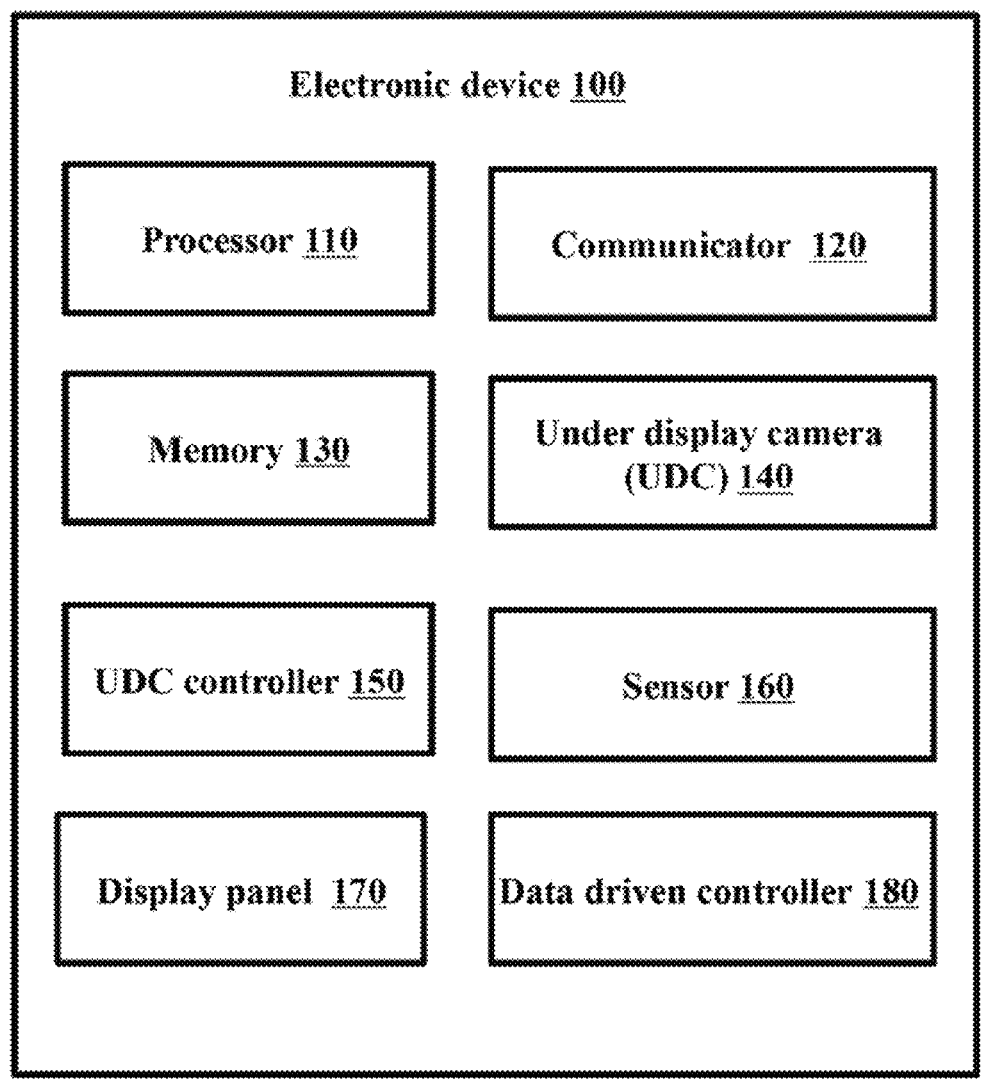
FIG. 6 is a diagram of hardware components of an electronic device, according to an embodiment.

FIG. 6 is a diagram of hardware components of an electronic device, according to an embodiment. The electronic device 100 may be, for example, but not limited to a laptop, a desktop computer, a notebook, a device-to-device (D2D) device, a vehicle to everything (V2X) device, a smartphone, a foldable phone, a smart TV, a tablet, an immersive device, and an internet of things (IoT) device. In an embodiment, the electronic device 100 includes a processor 110, a communicator 120, a memory 130, a UDC 140, a UDC controller 150, a sensor 160160, a display panel 170, and a data driven controller 180. The processor 110 is coupled with the communicator 120, the memory 130, the UDC 140, the UDC controller 150, the sensor 160160, the display panel 170, and a data driven controller 180

The UDC controller 150 may be configured to determine an optimal number of frames required to be captured for a scene to compensate one or more parameter to optimize an output media using the UDC 140. The one or more parameter may be, for example, but not limited to a light transmission loss associated with the scene, an ambient light parameter associated with the scene, a display panel characteristics associated with the UDC 140, an exposure time associated with one or more input frame, a gain associated with the one or more input frame, a temperature associated with the one or more input frame and focus region, and an environment lighting condition.

In an embodiment, the UDC controller 150 may be configured to receive the one or more input frame along with metadata information of the scene to be captured using the UDC 140. Further, the UDC controller 150 may be configured to measure one or more ambient light parameter of the scene. By analyzing the one or more input frame in connection with the one or more measured ambient light parameter, the UDC controller 150 may be configured to determine a light transmission loss through the display panel 170 associated with the UDC 140. Further, the UDC controller 150 may be configured to identify one or more intrinsic camera parameter associated with the one or more input frame and a type of the scene. The intrinsic camera parameter may be, for example, but not limited to an exposure time, a gain, a color, temperature and a focus region. The type of the scene may be, for example, but not limited to an indoor environment, an outdoor environment, a mix lighting condition, a bright day light, and low light condition. Further, the UDC controller 150 may be configured to determine the optimal number of frames required to be captured for the scene to compensate for the light transmission loss and the one or more ambient light parameter based on the one or more intrinsic camera parameter associated with the one or more input frame and the type of the scene.

Further, the UDC controller 150 may be configured to determine one or more display panel characteristics associated with the UDC 240. In an embodiment, the display panel characteristic associated with the UDC 140 is determined by obtaining the one or more intrinsic camera parameter associated with the one or more input frame, and determining the one or more display panel characteristic associated with the UDC 140 based on the intrinsic camera parameter. The display panel characteristics may be, for example, but not limited to a diffraction pattern, a point spread function of the display panel 170, and a modulation transfer function (MTF) of the display panel 170.

Further, the UDC controller 150 may be configured to apply the measured light transmission loss, the one or more ambient light parameter and the display panel characteristics for capturing each frame among the optimal number of frames. In an embodiment, the light transmission loss is determined by analyzing one or more preview frame from the UDC 140, and estimating the light transmission loss for the display panel 170 based on the analysis. Further, the UDC controller 150 may be configured to automatically modify the one or more media capture setting of the UDC 140 by applying the measured light transmission loss, the one or more ambient light parameter and the display panel characteristics for capturing each frame among the optimal number of frames.

Further, the UDC controller 150 may be configured to perform one or more multi-frame fusion on the determined optimal number of frames to obtain the multi-frame fusion media. In an embodiment, the UDC controller 150 may be configured to determine whether a dominant light source is presence in the scene. Upon determining the dominant light source is presence in the scene, the UDC controller 150 may be configured to analyze the scene to determine the multi-frame fusion media to be formed with the one or more input frame with multiple exposure values. Upon determining the dominant light source is not presence in the scene, the UDC controller 150 may be configured to analyze the scene to determine the multi-frame fusion media to be formed with the one or more input frame with same exposure value. Further, the UDC controller 150 may be configured to estimate a diffraction model on the analyzed multi-frame fusion media using a data driven model (e.g., AI model, machine learning (ML) model or the like). Further, the UDC controller 150 may be configured to perform an inversion operation to compensate for a diffraction loss in the analyzed multi-frame fusion media using the estimated diffraction model. The diffraction model is estimated on the analyzed multi-frame fusion media based on transmission characteristics of the display panel 170 and the light transmission loss.

Further, the UDC controller 150 may be configured to handle a light source spread correction on the multi-frame fusion media. In an embodiment, the UDC controller 150 may be configured to analyze the multi-frame fusion media to determine the type of the scene and localize the light source in the scene. Further, the UDC controller 150 may be configured to create a segmentation mask for the localized light source in the scene. The light spread correction is applied for the localized light source in the scene using the AI model, wherein the AI model learns a light spread function of display panel over a period of time. Further, the UDC controller 150 may be configured to apply a light spread correction for the localized light source in the scene using the created mask. Further, the UDC controller 150 may be configured to perform a content aware sharpness improvement to enhance the output media based on the applied light spread correction. Further, the UDC controller 150 may be configured to optimize the output media based on the light source spread correction on the multi-frame fusion media.

The UDC controller 150 is physically implemented by analog or digital circuits such as logic gates, integrated circuits, microprocessors, microcontrollers, memory circuits, passive electronic components, active electronic components, optical components, hardwired circuits, or the like, and may optionally be driven by firmware.

Further, the processor 110 may be configured to execute instructions stored in the memory 130 and to perform various processes. Various applications (e.g., virtual assistance application, voice assistance application or the like) are stored in the memory 130. The communicator 120 may be configured for communicating internally between internal hardware components and with external devices via one or more networks. The memory 130 also stores instructions to be executed by the processor 110. The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 130 may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in random access memory (RAM) or cache).

Further, at least one of the pluralities of modules/controller may be implemented through the AI model using the data driven controller 150. The data driven controller 150 may be a ML model based controller and AI model based controller. A function associated with the AI model may be performed through the non-volatile memory, the volatile memory, and the processor 110. The processor 110 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or AI model stored in the non-volatile memory and the volatile memory. The predefined operating rule or artificial intelligence model is provided through training or learning.

Being provided through learning may mean that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm may be a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although FIG. 6 shows various hardware components of the electronic device 100, it is to be understood that other embodiments are not limited thereon. In other embodiments, the electronic device 100 may include less or more number of components. Further, the labels or names of the components are used only for illustrative purpose and does not limit the scope of the invention. One or more components may be combined together to perform same or substantially similar function in the electronic device 100.

Figure 7A:
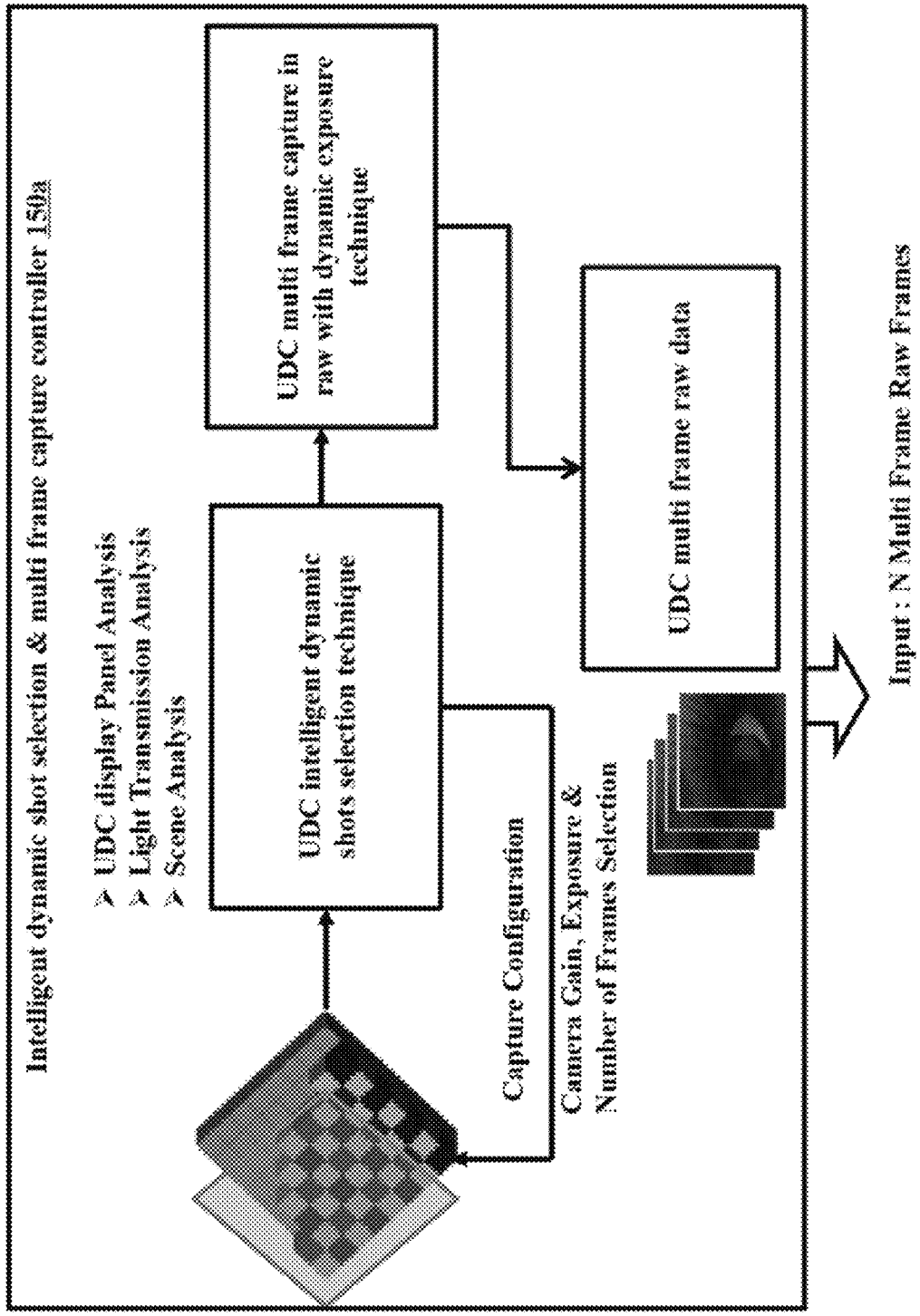
FIGS. 7a and 7b are diagrams of various hardware components of a UDC controller of the electronic device involved in under display camera image restoration using intelligent multi-frame fusion and artificial intelligence (AI) image restoration, according to an embodiment.
Figure 7B:
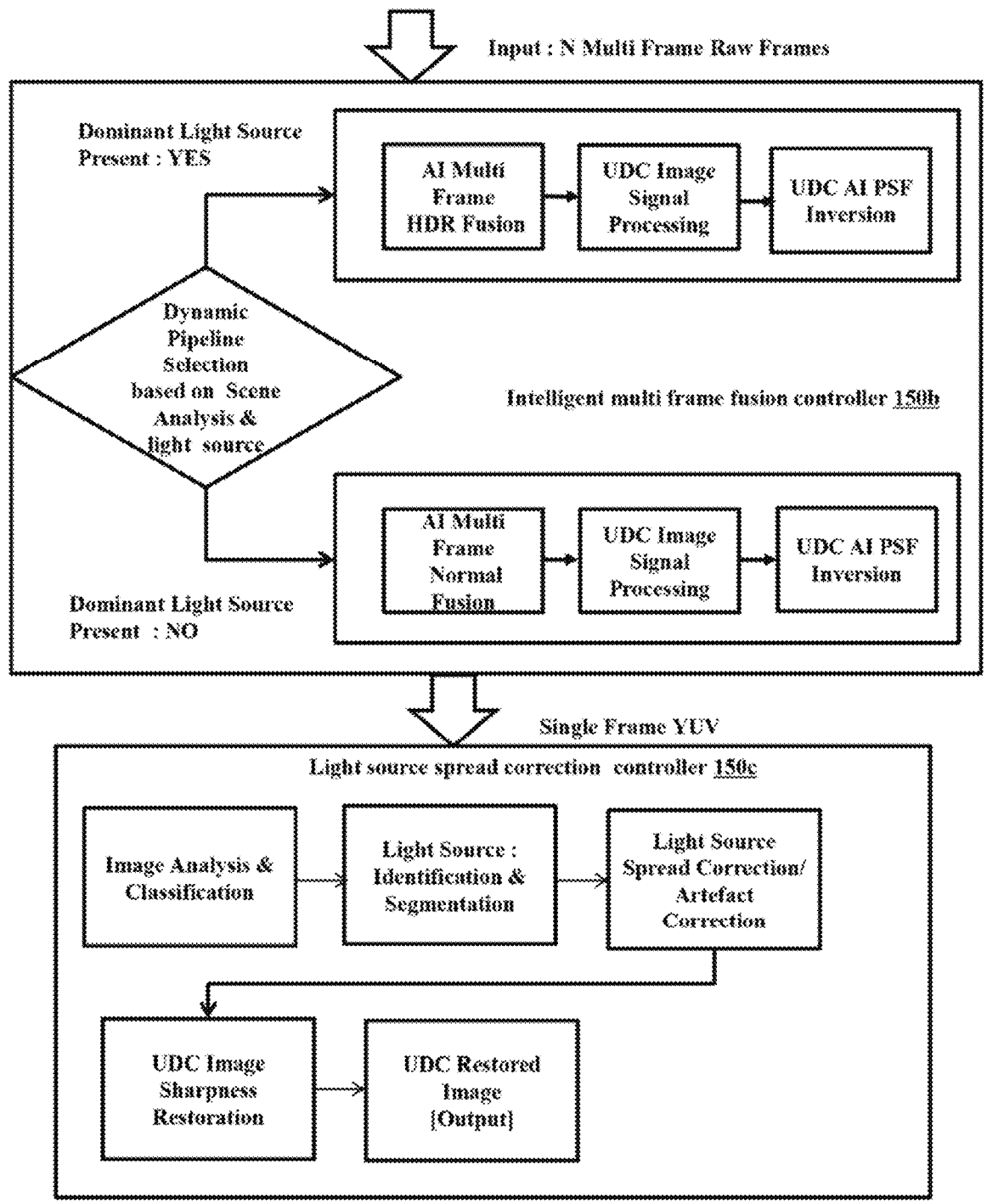

FIGS. 7a and 7b are diagrams of various hardware components of a UDC controller of the electronic device involved in under display camera image restoration using intelligent multi-frame fusion and AI image restoration, according to an embodiment. In an embodiment, the UDC controller 150 includes an intelligent dynamic shot selection and multi-frame capture controller 150a, an intelligent multi-frame fusion controller 150b and a light source spread correction controller 150c.

The intelligent dynamic shot selection and multi-frame capture controller 150a performs the analysis of display panel characteristics, estimates the light transmission efficiency of the display panel 170, and analyze the scene type (e.g., indoor, outdoor, mix lighting, bright day light, low light etc.). Based on the UDC display panel analysis, the light transmission analysis, and the scene analysis, the intelligent dynamic shot selection and multi-frame capture controller 150a estimates the optimal number of frame to be used for fusion. The intelligent dynamic shot selection and multi-frame capture controller 150a decides the camera parameters for each captured frame (e.g. gain, exposure, color temperature or the like).

In an embodiment, in order to determine the UDC dynamic shot selection, the intelligent dynamic shot selection and multi-frame capture controller 150a captures a point light source from the UDC 140 and reference non-UDC camera and plots the diffraction characteristic as spread of light as a function of distance and angle. Further, the intelligent dynamic shot selection and multi-frame capture controller 150a feeds the diffraction plot as input to the UDC dynamic shot selection. In another embodiment, the intelligent dynamic shot selection and multi-frame capture controller 150a feeds the finite lens aperture, lens performance, finite pixel size, and noise information as input to the UDC dynamic shot selection.

In another embodiment, the intelligent dynamic shot selection and multi-frame capture controller 150a captures the multi-frame raw data from the sensor 160160 (e.g., UDC sensor or the like) under different illumination, varying the camera parameters such as exposure, camera gain or the like. Further, the intelligent dynamic shot selection and multi-frame capture controller 150a utilize the data (e.g., multi-frame raw data, camera parameters or the like) to derive the transmission loss and noise characteristic of UDC 140. Further, the intelligent dynamic shot selection and multi-frame capture controller 150a uses the data as input for the dynamic shot selection.

The intelligent dynamic shot selection and multi-frame capture controller 150a is trained with static and dynamic parameters. The static parameter may be, for example, but not limited to the diffraction plot and the MTF plot. The diffraction plot corresponds to the diffraction characteristic as spread of light as a function of distance and angle. The MTF plot defines finite lens aperture, lens performance, finite pixel size, noise, non-linearities, quantization and diffraction. The dynamic parameter may be, for example, but not limited to raw frames at different illumination and camera settings. Based on the static and dynamic parameters, intelligent dynamic shot selection and multi-frame capture controller 150a will decide optimal number of frames (N) and each frame exposure, camera gain, color temperature to provide best IQ for the UDC multi-frame fusion.

Further, the intelligent multi-frame fusion controller 150b determines the presence of dominant light source in the scene and uses the pixel analysis to determine the saturated pixels and cluster the saturated pixels. Further, the intelligent multi-frame fusion controller 150b switches to the high dynamic range (HDR) pipeline, in which the AI multi-frame fusion will compensate for the dominant light source.

In another embodiment, the intelligent multi-frame fusion controller 150b may determine the light source in the scene and perform scene analysis to define the synthesis of multi-frame to be formed with frames with multiple exposure values (EVs) (HDR Fusion). The synthesis of multi-frame to be formed with frames with similar EVs (Normal Fusion). Based on transmission characteristics of the display panel and light transmission loss, the intelligent multi-frame fusion controller 150b may estimate the diffraction model and utilize the AI techniques to learn the diffraction model. The intelligent multi-frame fusion controller 150b may perform the inversion operation to compensate for diffraction loss in image acquisition (e.g., AI point spread function inversion).

Further, the light source spread correction controller 150c generates the UDC restored image based on the UDC image sharpness restoration. In an embodiment, the light source spread correction controller 150c applies the light spread correction locally based on the segmentation mask. The localized correction restores the light source effectively.

Although FIG. 7a and FIG. 7b show various hardware components of the UDC controller 150 but it is to be understood that other embodiments are not limited thereon. In other embodiments, the UDC controller 150 may include less or more number of components. Further, the labels or names of the components are used only for illustrative purpose and does not limit the scope of the invention. One or more components may be combined together to perform same or substantially similar function in the UDC controller 150.

FIG. 8 is a flowchart 800 of a method for capturing media using the UDC in the electronic device, according to an embodiment. As shown in FIG. 8, the operations 802-808 are performed by the UDC controller 150.

In operation 802, the method includes determining the optimal number of frames required to be captured for the scene to compensate the parameter to optimize the output media using the UDC 140. In operation 804, the method includes performing the multi-frame fusion on the determined optimal number of frames to obtain the multi-frame fusion media. In operation 806, the method includes handling the light source spread correction on the multi-frame fusion media. In operation 808, the method includes optimizing the output media based on the light source spread correction on the multi-frame fusion media.

The method allows overcoming the UDC image quality degradation and provides and UDC image restoration. The method estimates the display panel characteristic and models the degradation of UDC images, defines the optimal number of frames, and camera parameters for each frame to be used for the multi-frame fusion in an effective manner. The method allows the optimal pipeline selection and compensation for dominant light source, so as to provide an overall UDC image quality improvement.

The electronic device 100 may analyze the preview frames from the UDC camera, identifies the light transmission loss for specific display panel, determines the diffraction pattern and point spread function of display panel, and determines the modulation transfer function of the display panel. The electronic device 100 may determine the intrinsic camera parameters and environment lighting conditions. Based on these parameters, the electronic device 100 dynamically defines the N, number of raw frames to be captured for the specific scene. The electronic device 100 dynamically defines the exposure time, gain, color temperature, and focus region for each of the N raw frames. The electronic device 100 acquires the N raw frames from under display camera with dynamic setting, determines the dominant light source presence in the scene, based on the dominant light source in the scene, and decides the fusion pipeline of multi-frames in an effective manner.

The method may be used to configure the UDC for the electronic device 100 and image restoration based on ambient light conditions and compensating for the loss caused by the display panel blocking the camera.

Figure 9B:
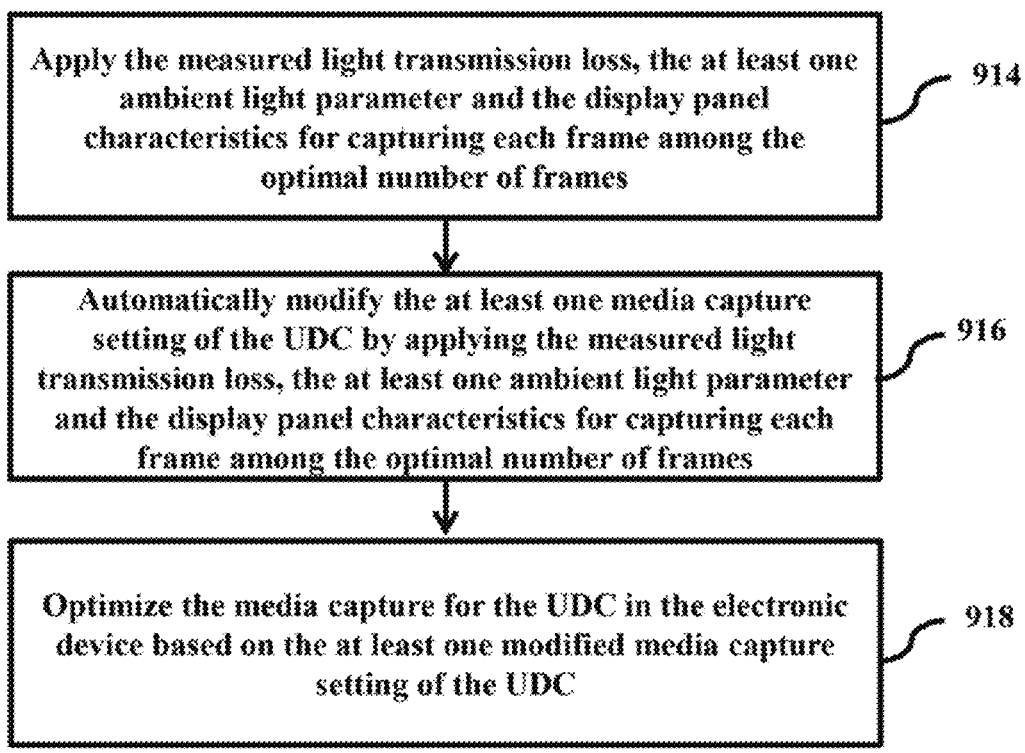

FIGS. 9a and 9b are a flowchart 900 of a method for capturing media using the UDC in the electronic device based on a media capture setting of the UDC, according to an embodiment. As shown in FIGS. 9a and 9b, the operations 902-918 are performed by the UDC controller 150.

In operation 902, the method includes receiving the input frame along with the metadata information of the scene to be captured using the UDC 140. In operation 904, the method includes measuring the ambient light parameter of the scene. In operation 906, the method includes determining the light transmission loss through the display panel 170 associated with the UDC 140 by analyzing the input frame in connection with the measured ambient light parameter.

In operation 908, the method includes identifying the intrinsic camera parameter associated with the input frame and the type of the scene. In operation 910, the method includes determining the optimal number of frames required to be captured for the scene to compensate for the light transmission loss and the ambient light parameter based on the intrinsic camera parameter associated with the input frame and the type of the scene. In operation 912, the method includes determining the display panel characteristics associated with the UDC 140.

In operation 914, the method includes applying the measured light transmission loss, the ambient light parameter and the display panel characteristics for capturing each frame among the optimal number of frames. In operation 916, the method includes automatically modifying the media capture setting of the UDC 140 by applying the measured light transmission loss, the ambient light parameter and the display panel characteristics for capturing each frame among the optimal number of frames. In operation 918, the method includes optimizing the media capture for the UDC 140 in the electronic device 100 based on the modified media capture setting of the UDC 140.

FIG. 10 is a flowchart 1000 of a method for capturing media using the UDC in the electronic device based on a dominant light source presence in a scene, according to embodiments an embodiment. As shown in FIG. 10, the operations 1002-1012 are performed by the UDC controller 150.

In operation 1002, the method includes determining whether the dominant light source is presence in the scene. Upon determining the dominant light source is presence in the scene, in operation 1004, the method includes analyzing the scene to determine the multi-frame fusion media to be formed with the input frame with multiple exposure values. Upon determining the dominant light source is not presence in the scene, in operation 1006, the method includes analyzing the scene to determine the multi-frame fusion media to be formed with the input frame with same exposure value.

In operation 1008, the method includes estimating the diffraction model on the analyzed multi-frame fusion media using the AI model. In operation 1010, the method includes performing the inversion operation to compensate for the diffraction loss in the analyzed multi-frame fusion media using the estimated diffraction model. In operation 1012, the method includes optimizing the media capture for the UDC 140 in the electronic device 100 based on the inversion operation.

Figure 11:
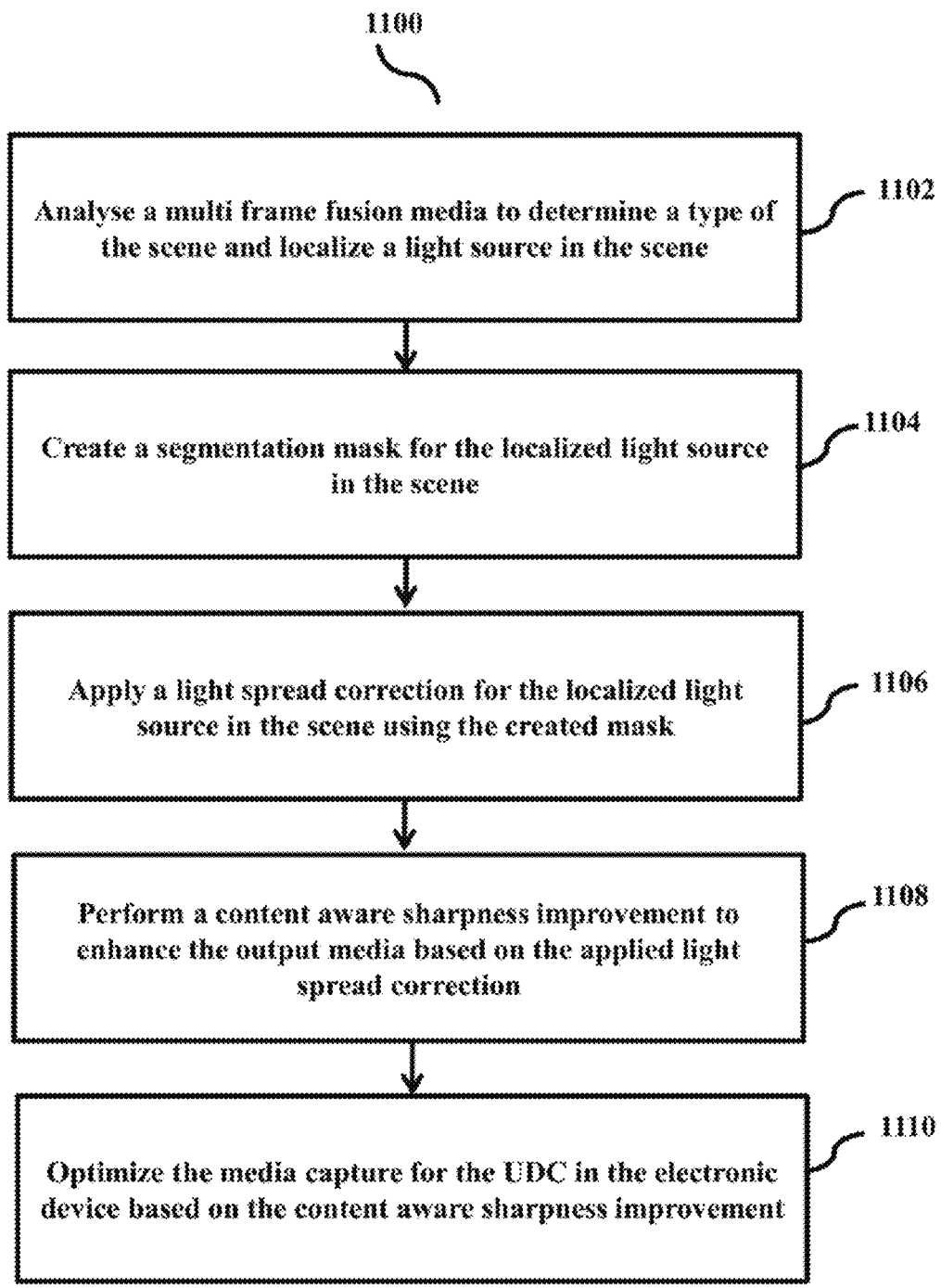
FIG. 11 is a flowchart of a method for capturing media using the UDC in the electronic device based on a content aware sharpness improvement, according to an embodiment.

FIG. 11 is a flowchart 1100 of a method for capturing media using the UDC in the electronic device based on a content aware sharpness improvement, according to an embodiment. As shown in the FIG. 11, the operations 1102-1110 are performed by the UDC controller 150.

In operation 1102, the method includes analyzing the multi-frame fusion media to determine the type of the scene and localize the light source in the scene. In operation 1104, the method includes creating the segmentation mask for the localized light source in the scene. In operation 1106, the method includes applying the light spread correction for the localized light source in the scene using the created mask. In operation 1108, the method includes performing the content aware sharpness improvement to enhance the output media based on the applied light spread correction. In operation 1110, the method includes optimizing the media capture for the UDC 140 in the electronic device 100 based on the content aware sharpness improvement.

Figure 12A:
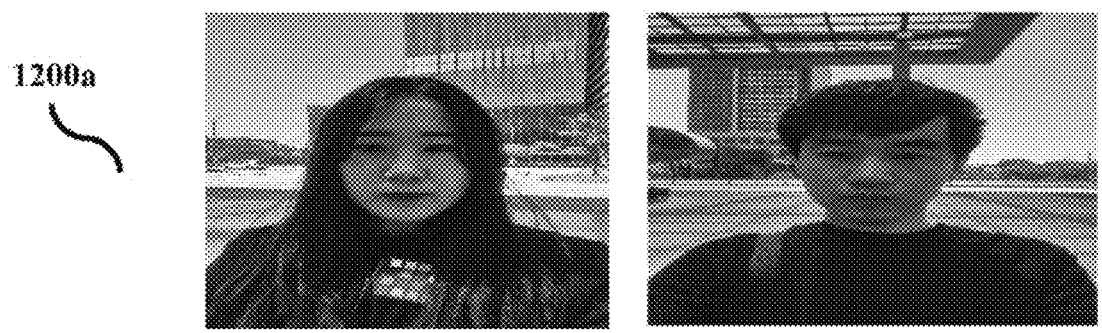
FIGS. 12a, 12b, 12c, 12d and 12e are diagrams of examples of different scene types and the representative UDC sample, according to an embodiment.
Figure 12B:
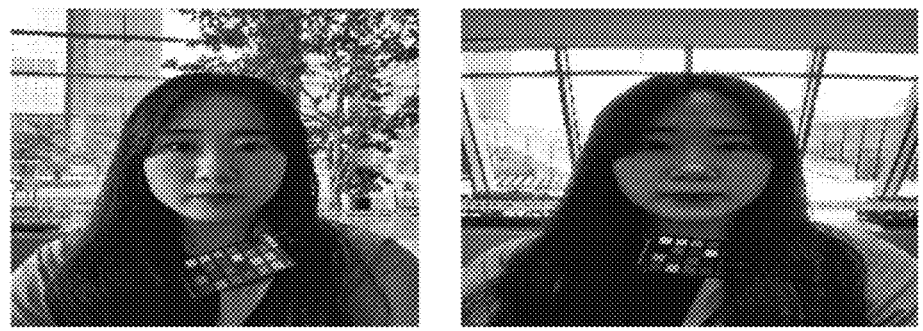
Figure 12C:
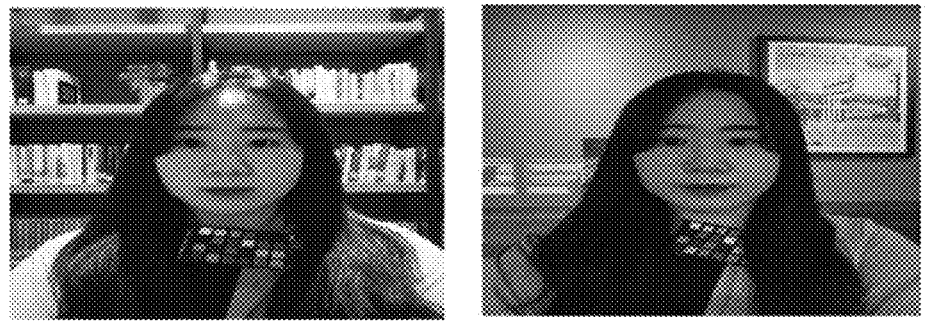
Figure 12D:
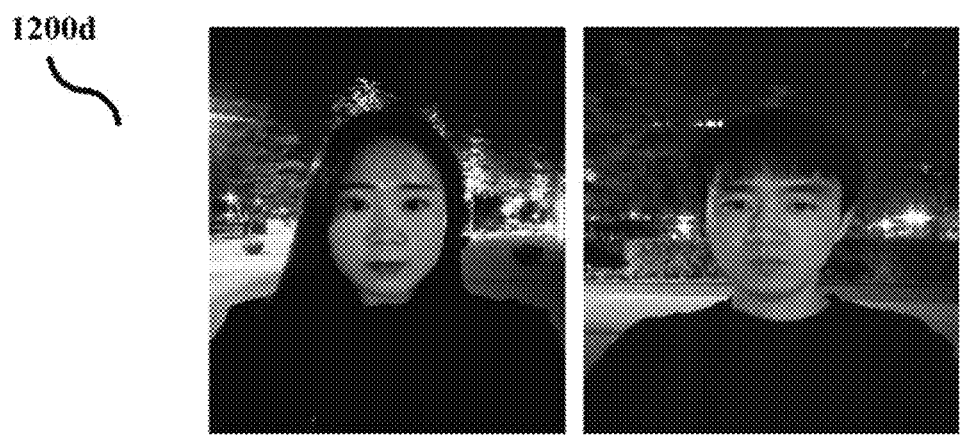
Figure 12E:
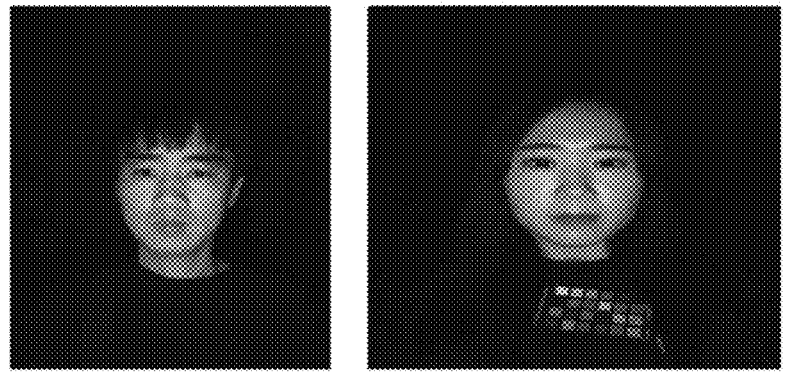

FIGS. 12a, 12b, 12c, 12d and 12e are diagrams of examples 1200a-1200e of different scene types and the representative UDC sample, according to an embodiment. The scene 1200a is an outdoor scene with bright light (FIG. 12a). The UDC intelligent dynamic shot selection module may set N as 3, and 3 EV0 frames. The scene 1200b is an indoor scene with bright light (FIG. 12b). The UDC intelligent dynamic shot selection module may set N as 5, and 3 EV0 frames and 2 EV-2 frames. The scene 1200c is an indoor scene with moderate light (FIG. 12c). The UDC intelligent dynamic shot selection module may set N as 8, and 5 EV0 frames, 2 EV-2 frames, and a single EV+2 frame. The scene 1200d is an outdoor scene with low light (FIG. 12d). The UDC intelligent dynamic shot selection module may set N as 12, and 8 EV0 frames, 2 EV-2 frames, and 2 EV+2 frames. The scene 1200e is an indoor scene with extreme low light (FIG. 12e). The UDC intelligent dynamic shot selection module may set N as 14, and 8 EV0 frames, 2 EV-2 frames, 2 EV+2 frames, a single EV+3 frame and a single EV+4 frame.

Figure 13:
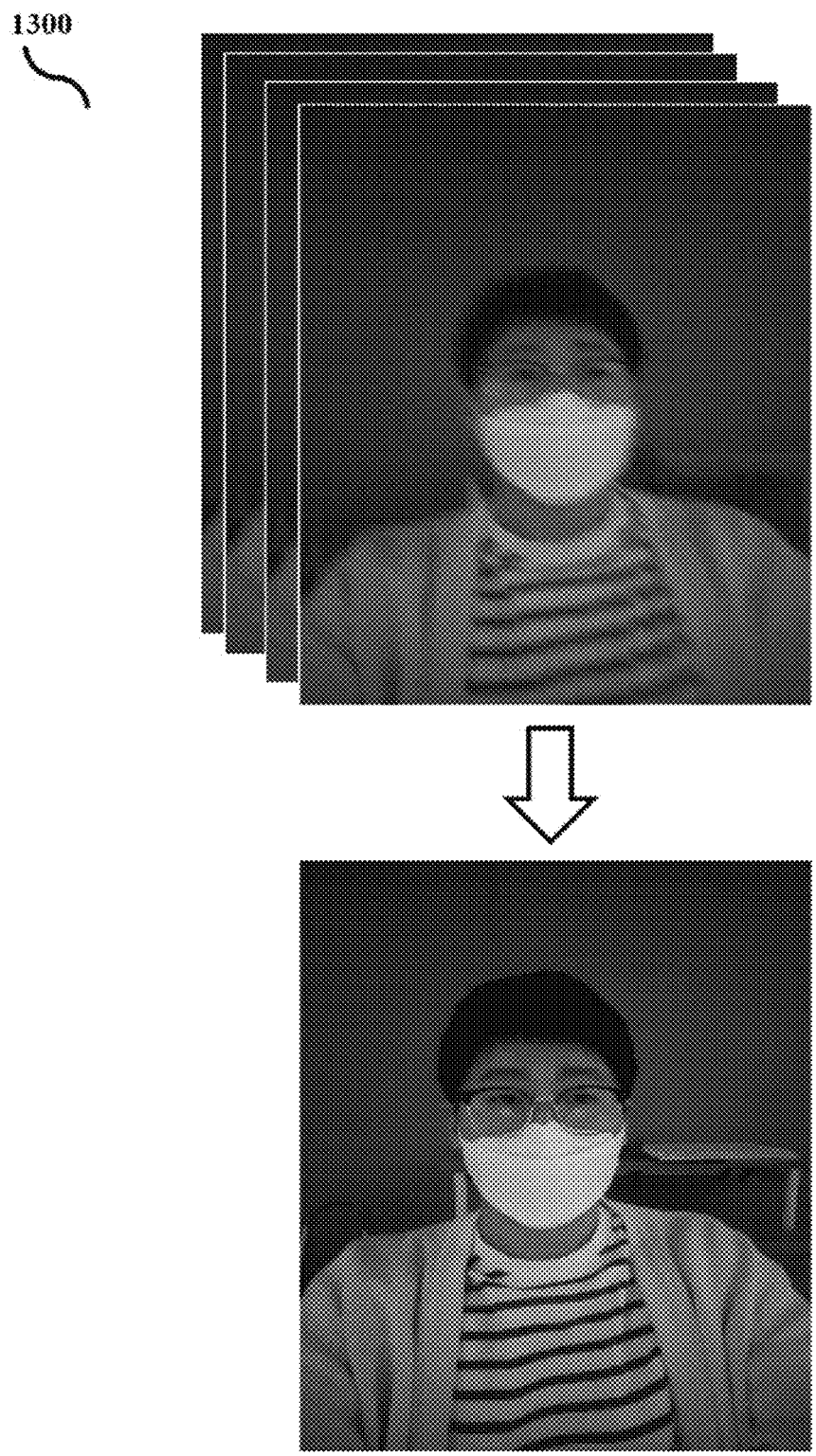
FIG. 13 is a diagram of an example illustration in which UDC restoration is performed after obtaining the N input frames from the UDC, according to an embodiment.

FIG. 13 is a diagram of an example illustration 1300 in which UDC restoration is performed after obtaining the N input frames from the UDC, according to an embodiment.

The UDC controller 150 performs an analysis of display panel characteristics, estimates the light transmission efficiency of the display, and analyzes the scene type (e.g., indoor, outdoor, mix lighting, bright day light, low light, and so on). Further, the UDC controller 150 determines the optimal number of frames to be used for fusion and decides the camera parameters for each captured frame such as gain, exposure, color temperature, and so on.

The UDC controller 150 may acquire the N Raw frames from the UDC 140 with dynamic setting and determines the dominant light source presence in the scene. Based on the dominant light source in the scene, The UDC controller 150 may decide the fusion pipeline of multi-frames.

Figure 14:
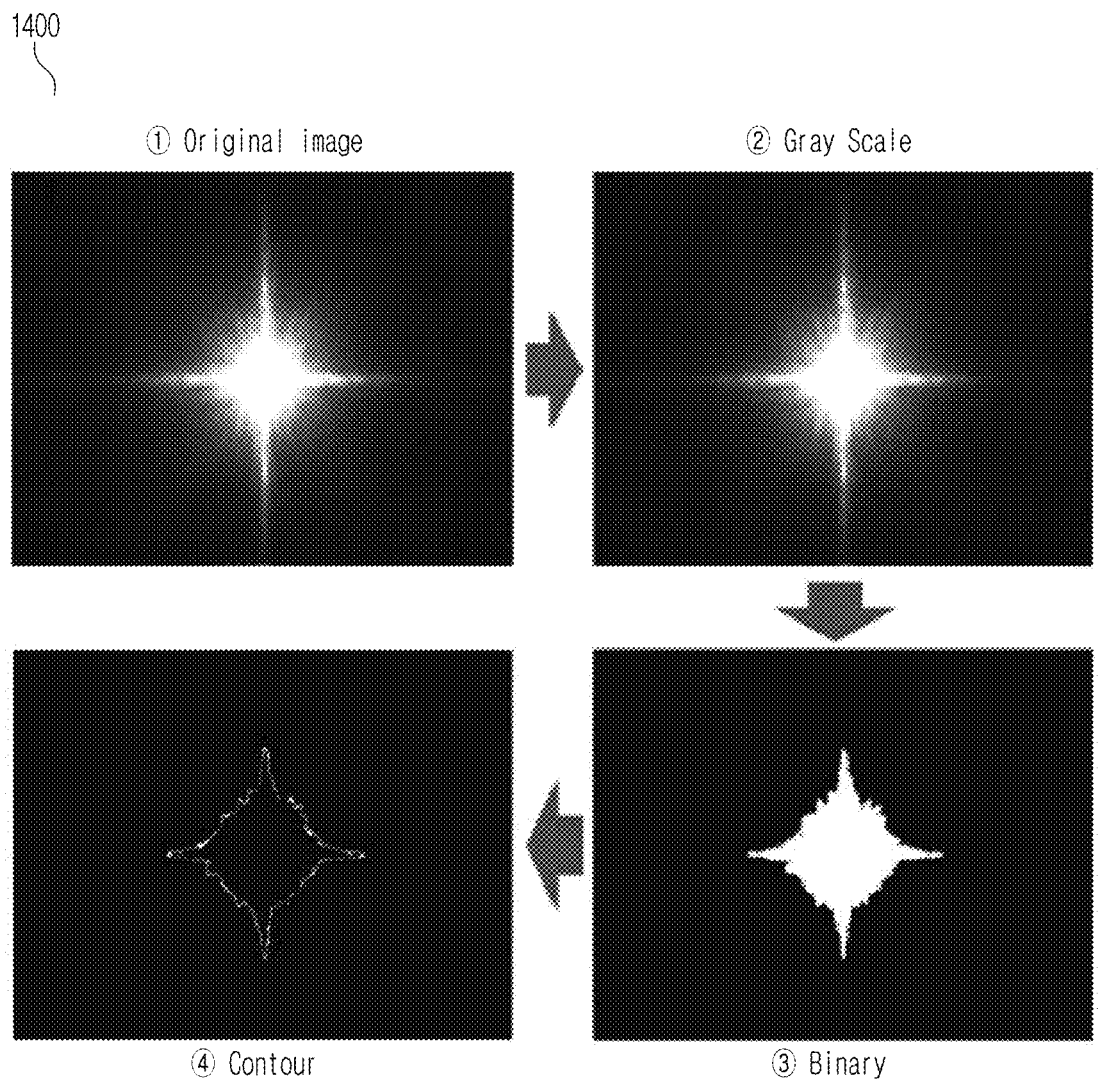
FIG. 14 is a diagram of an example illustration in which identification and segmentation of a light source is depicted, according to an embodiment.

FIG. 14 is a diagram of an example illustration 1400 in which identification and segmentation of a light source is depicted, according to an embodiment. As shown in the FIG. 14, the point light sources get severely degraded due to the UDC optical system and restoration of point light sources needs special attention, the method applies light spread correction locally based on the segmentation mask. The localized correction restores the light source more effectively and there are multiple methods to localize the light source, the method applies simple threshold and counter based segmentation techniques to segment out the dominant light source from the rest of the scene. The binary mask is created as a segmentation mask for the dominant light source and the mask is used to provide localized correction in the image for the dominant light source.

FIGS. 15a and 15b are diagrams of an example illustration in which a line spread function (LSF) is explained based on the UDC, according to an embodiment. Diffraction occurs due to the BML pattern of the UDC, and the PSF has longer side lobe compared to without the BML's PSF. This property causes the MTF characteristics to deteriorate, resulting in blurry images from UDC. FIG. 15a and FIG. 15b compares the LSF of non-UDC image versus a UDC image.

Figure 16:
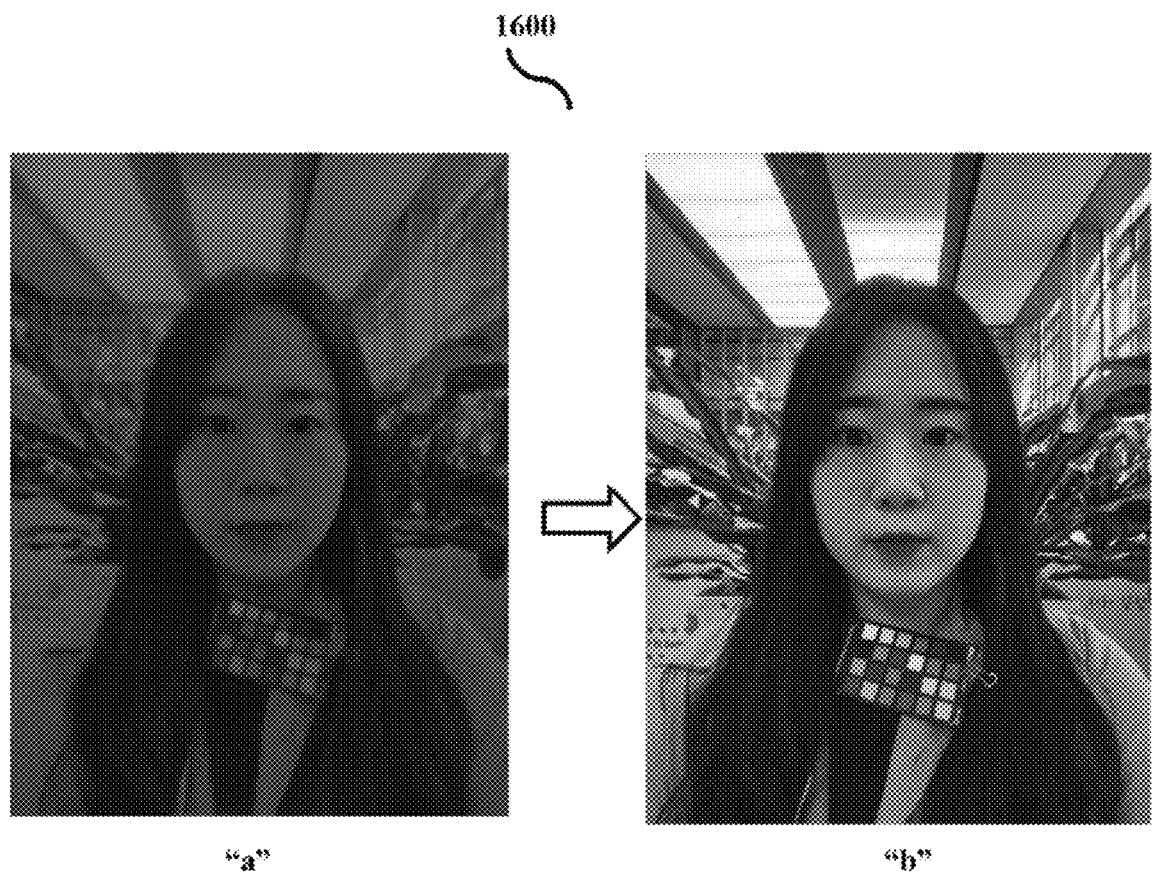
FIG. 16 is a diagram of an example UDC image prior to, and after, UDC restoration, according to an embodiment.

FIG. 16 is a diagram 1600 of an example UDC image prior to, and after, UDC restoration, according to an embodiment. The notation "a" of the UDC image is displayed before the UDC restoration. The notation "b" of the UDC image is displayed after the UDC restoration.

Figure 17:
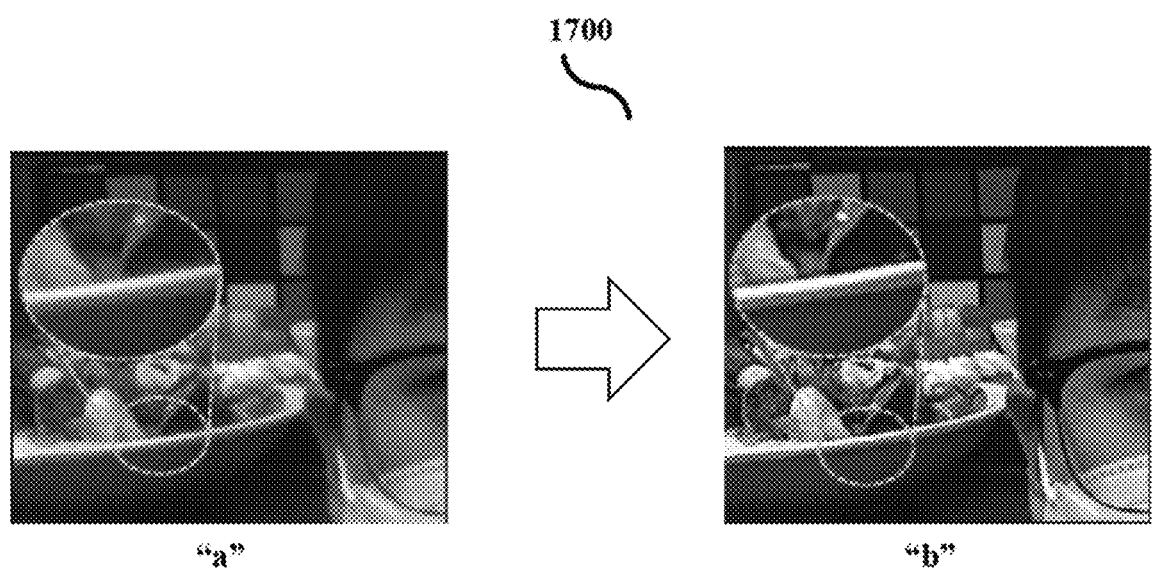
FIG. 17 is a diagram of an example illustration in which low light and sharpness improvement is depicted, according to an embodiment.

FIG. 17 is a diagram 1700 of an example illustration in which low light and sharpness improvement is depicted, according to an embodiment. The notation "a" of the UDC image is displayed without low light and sharpness improvement. The notation "b" of the UDC image is displayed after the low light and sharpness improvement.

Figure 18:
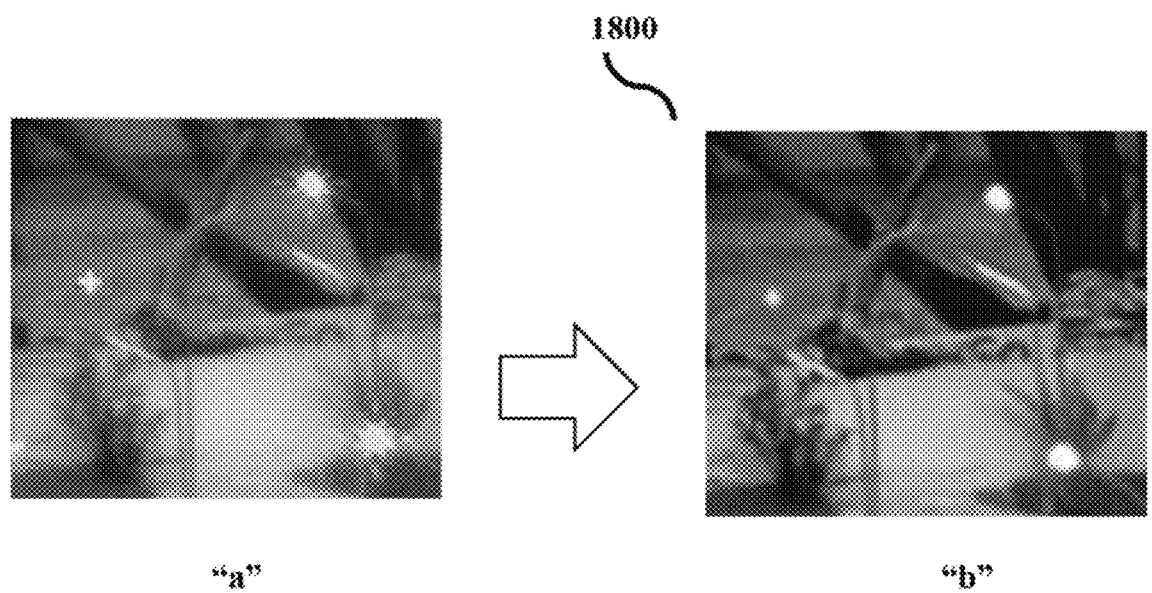
FIG. 18 is a diagram of an example illustration in which light spread improvement is depicted, according to an embodiment.
Figure 22:
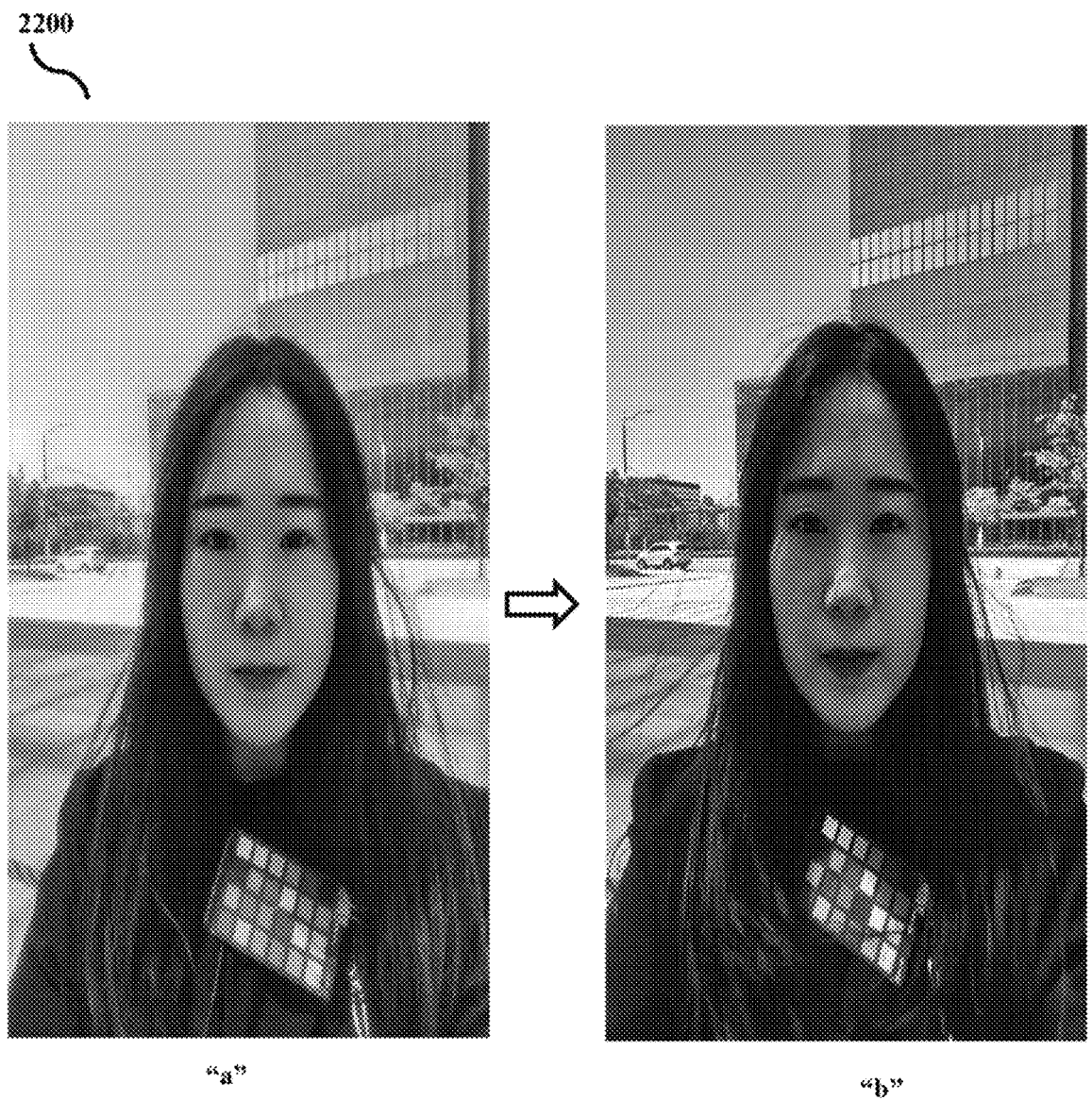
Figure 23:
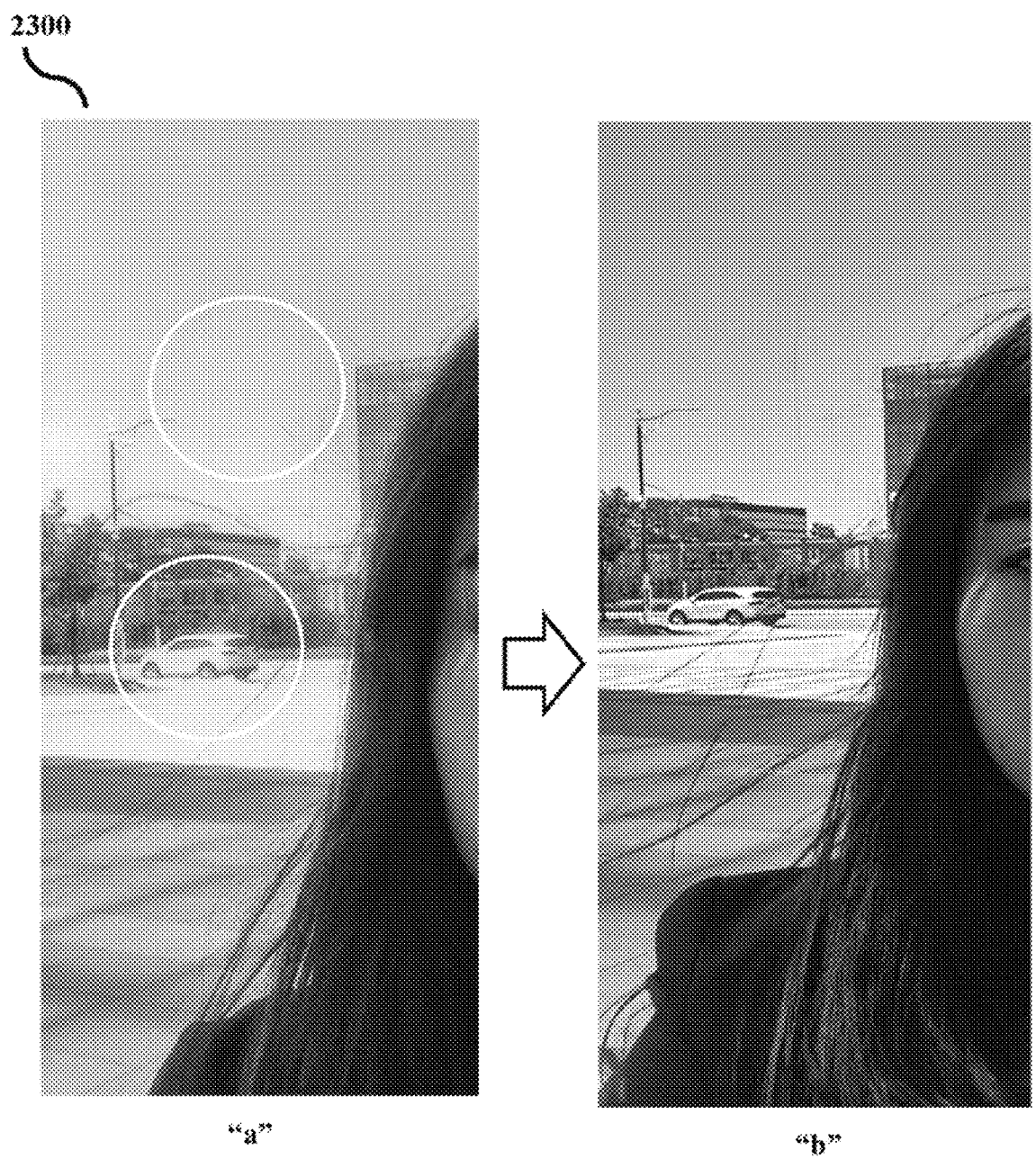
Figure 25:
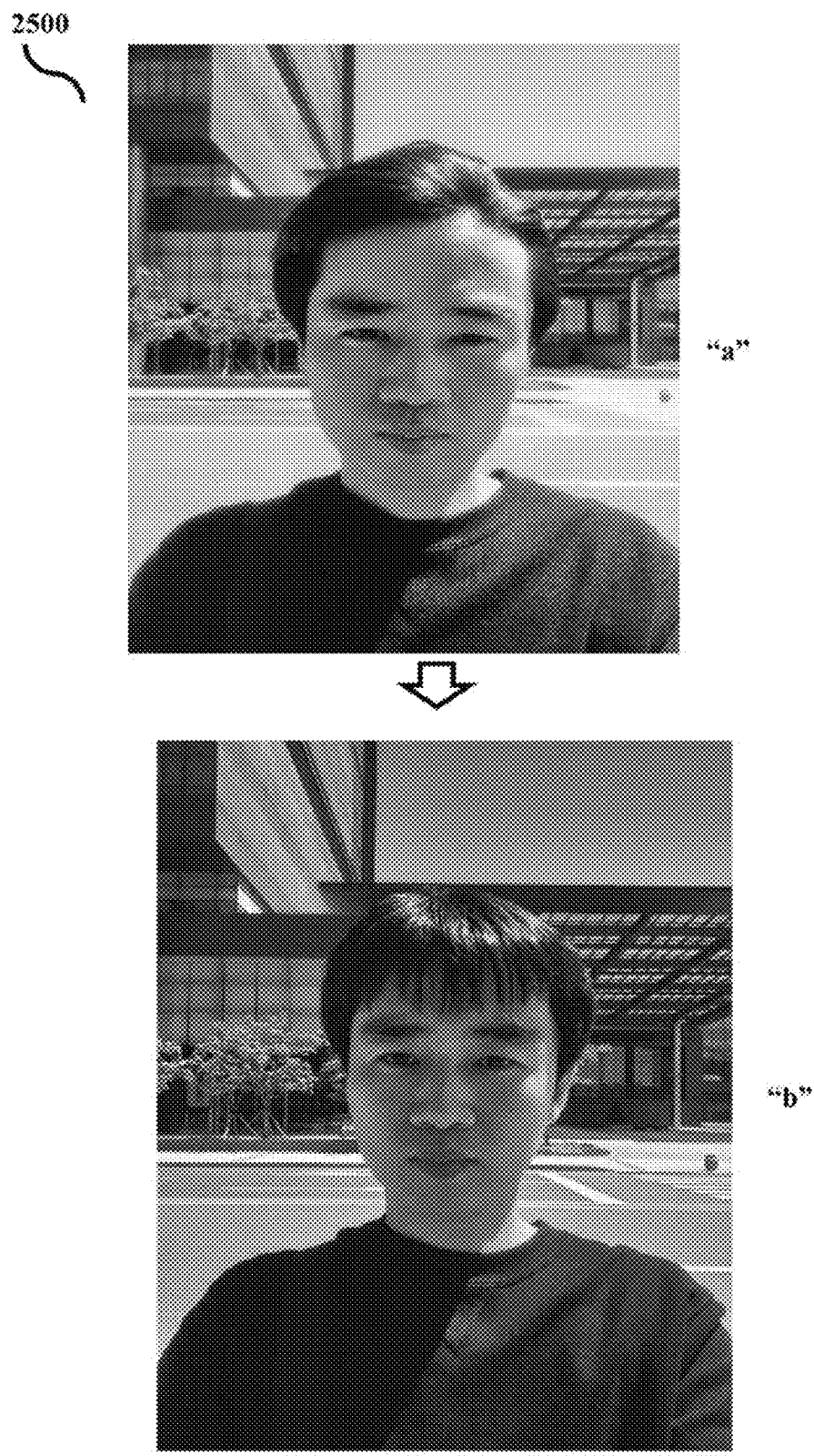

FIG. 18 is a diagram 1800 of an example illustration in which light spread improvement is depicted, according to an embodiment. The notation "a" of the UDC image is displayed without light source spread improvement. The notation "b" of the UDC image is displayed after the light source spread improvement.

FIG. 19 is a diagram 1900 of an example illustration in which a UDC image restoration is performed using a HDR pipeline, according to an embodiment. The notation "a" of the UDC image is displayed under dominant light source. The notation "b" of the UDC image is displayed with the HDR pipeline under dominant light source.

As depicted in notation "b" of FIG. 19, the UDC image includes a dominant light source. The restoration allows removing the dominant light source. The image analysis and classification may determine the scene type, localize the dominant light source in the scene and create a segmentation mask for the light source, compensate the light spread of the dominant light source using AI method, wherein the AI method learns the light spread function of display panel.

FIGS. 20 and 21 are diagrams 2000 and 2100 of example illustrations in which restorations of UDC images through light spread correction is depicted, according to an embodiment.

The notation "a" of FIG. 20, the UDC image is displayed without light source spread improvement. The notation "b" of FIG. 20, the UDC image is displayed after the light source spread improvement.

The notation "a" of FIG. 21, the UDC image is displayed without light source spread improvement. The notation "b" of FIG. 21, the UDC image is displayed after the light source spread improvement.

FIGS. 22, 23, 24 and 25 are diagrams 2200-2500 of example illustrations in which UDC image restorations are depicted, according to an embodiment.

The notation "a" of FIGS. 22-25, the UDC image is displayed based on the existing methods. The notation "b" of FIGS. 22-25, the UDC image is displayed based on the intelligent multi-frame fusion and AI image restoration disclosed herein.

The various actions, acts, blocks, steps, or the like in the flowcharts may be performed in the order presented, in a different order or simultaneously. Further, in some embodiments, some of the actions, acts, blocks, steps, or the like may be omitted, added, modified, skipped, or the like without departing from the scope of the invention.

The embodiments disclosed herein may be implemented through at least one software program running on at least one hardware device and performing network management functions to control the network elements.

Also, while embodiments of the disclosure have been shown and described, the disclosure is not limited to the aforementioned specific embodiments, and it is apparent that various modifications can be made by those having ordinary skill in the art to which the disclosure belongs, without departing from the gist of the disclosure as claimed by the appended claims, and it is intended that such modifications are not to be interpreted independently from the technical idea or prospect of the disclosure.

What is claimed is:

1. An electronic device comprising:
   an under display camera (UDC); and
   a UDC controller configured to:
     determine an optimal number of frames required to be captured for a scene to compensate at least one parameter to optimize an output media using the UDC;
     obtain a multi-frame fusion media by performing at least one multi-frame fusion on the determined optimal number of frames;
     perform a light source spread correction on the multi-frame fusion media; and
     optimize the output media based on the light source spread correction on the multi-frame fusion media.

2. The electronic device of claim 1, wherein the UDC controller is further configured to determine the optimal number of frames by:
   receiving at least one input frame and a metadata information of the scene to be captured using the UDC;
   measuring at least one ambient light parameter of the scene;
   determining a light transmission loss through a display panel associated with the UDC by analyzing at least one input frame in connection with at least one ambient light parameter;
   identifying at least one intrinsic camera parameter associated with the at least one input frame and a type of the scene; and
   determining the optimal number of frames required to be captured for the scene to compensate for the light transmission loss and the at least one ambient light parameter based on the at least one intrinsic camera parameter associated with the at least one input frame and the type of the scene.

3. The electronic device of claim 2, wherein the at least one intrinsic camera parameter comprises at least one of an exposure time, a gain, a color, temperature and a focus region, and
   wherein the type of the scene comprises at least one of an indoor environment, an outdoor environment, a mix lighting condition, a bright day light, and low light condition.

4. The electronic device of claim 2, wherein the UDC controller is further configured to:
   determine at least one display panel characteristic associated with the UDC for capturing each frame among the optimal number of frames;
   apply the measured light transmission loss, the at least one ambient light parameter; and the display panel characteristics for capturing each frame among the optimal number of frames; and
   automatically modify at least one media capture setting of the UDC by applying the measured light transmission loss, the at least one ambient light parameter and the at least one display panel characteristic.

5. The electronic device of claim 4, wherein the UDC controller is further configured to determine the at least one display panel characteristic associated with the UDC by:
   obtaining at least one intrinsic camera parameter associated with the at least one input frame; and
   determining the at least one display panel characteristic associated with the UDC based on the at least one intrinsic camera parameter.

6. The electronic device of claim 4, wherein the at least one display panel characteristic comprises a diffraction pattern, a point spread function of the display panel, and a modulation transfer function (MTF) of the display panel.

7. The electronic device of claim 2, wherein the UDC controller is further configured to determine the light transmission loss by:
   analyzing at least one preview frame from the UDC, and
   estimating the light transmission loss for the display panel based on the analyzing of the at least one preview frame.

8. The electronic device of claim 1, wherein the UDC controller is further configured to obtain the multi-frame fusion media by:
   determining whether a dominant light source is present in the scene;
   performing at least one of:
     analyzing the scene to determine the multi-frame fusion media to be formed with at least one input frame with multiple exposure values upon determining the dominant light source is present in the scene, or
     analyzing the scene to determine the multi-frame fusion media to be formed with the at least one input frame with a same exposure value upon determining the dominant light source is not present in the scene;
   estimating a diffraction model on the multi-frame fusion media using an artificial intelligence (AI) model; and performing an inversion operation to compensate for a diffraction loss in the multi-frame fusion media using the estimated diffraction model.

9. The electronic device of claim 8, wherein the diffraction model is estimated on the multi-frame fusion media based on transmission characteristics of a display panel and a light transmission loss.

10. The electronic device of claim 1, wherein the UDC controller is further configured to perform the light source spread correction on the multi-frame fusion media by:
analyzing the multi-frame fusion media to determine a type of the scene and localize a light source in the scene;
creating a segmentation mask for the localized light source in the scene;
applying a light spread correction for the localized light source in the scene using the segmentation mask; and
performing a content aware sharpness improvement to enhance the output media based on the applied light spread correction.

11. The electronic device of claim 10, wherein the light spread correction is applied for the localized light source in the scene using an artificial intelligence (AI) model, and wherein the AI model is configured to learn a light spread function of a display panel over a period of time.

12. The electronic device of claim 1, wherein the at least one parameter comprises at least one of a light transmission loss associated with the scene, an ambient light parameter associated with the scene, a display panel characteristic associated with the UDC, an exposure time associated with at least one input frame, a gain associated with the at least one input frame, a temperature associated with the at least one input frame and focus region, and an environment lighting condition.

13. An electronic device comprising:
an under display camera (UDC); and
a UDC controller configured to:
receive at least one input frame and a metadata information of a scene to be captured using the UDC;
measure at least one ambient light parameter of the scene;
determine a light transmission loss through a display panel associated with the UDC by analyzing the at least one input frame in connection with at least one measured ambient light parameter;
identify at least one intrinsic camera parameter associated with the at least one input frame and a type of the scene;
determine an optimal number of frames required to be captured for the scene to compensate for the light transmission loss and at least one ambient light parameter based on the at least one intrinsic camera parameter associated with the at least one input frame and the type of the scene;
determine at least one display panel characteristic associated with the UDC;
apply the measured light transmission loss, the at least one ambient light parameter and the display panel characteristics for capturing each frame among the optimal number of frames;
automatically modify at least one media capture setting of the UDC by applying the measured light transmission loss, the at least one ambient light parameter and the at least one display panel characteristic; and
optimize a media capture for the UDC in the electronic device based on the at least one modified media capture setting of the UDC.

14. A method for capturing media using an under display camera (UDC) in an electronic device, comprising:
determining, by the electronic device, an optimal number of frames required to be captured for a scene to compensate at least one parameter to optimize an output media using the UDC;
obtaining, by the electronic device, a multi-frame fusion media by performing at least one multi-frame fusion on the determined optimal number of frames;
performing, by the electronic device, a light source spread correction on the multi-frame fusion media; and
optimizing, by the electronic device, the output media based on the light source spread correction on the multi-frame fusion media.

15. The method of claim 14, wherein determining, by the electronic device, the optimal number of frames comprises:
receiving, by the electronic device, at least one input frame and a metadata information of the scene to be captured using the UDC;
measuring, by the electronic device, at least one ambient light parameter of the scene;
determining, by the electronic device, a light transmission loss through a display panel associated with the UDC by analyzing the at least one input frame in connection with at least one measured ambient light parameter;
identifying, by the electronic device, at least one intrinsic camera parameter associated with the at least one input frame and a type of the scene; and
determining, by the electronic device, the optimal number of frames required to be captured for the scene to compensate for the light transmission loss and the at least one ambient light parameter based on the at least one intrinsic camera parameter associated with the at least one input frame and the type of the scene.

* * * * *